United States Patent

Fado et al.

[11] Patent Number: 5,974,382
[45] Date of Patent: Oct. 26, 1999

[54] CONFIGURING AN AUDIO INTERFACE WITH BACKGROUND NOISE AND SPEECH

[75] Inventors: Frank Fado, Highland Beach; Peter Guasti, Coral Springs; Amado Nassiff, Boynton Beach; Ronald VanBuskirk, Indiantown, all of Fla.

[73] Assignee: International Business Machines Corporation, Armonk, N.Y.

[21] Appl. No.: 08/958,661

[22] Filed: Oct. 29, 1997

[51] Int. Cl.⁶ .................................................... G10L 3/00
[52] U.S. Cl. ........................................ 704/270; 704/275
[58] Field of Search ................................... 704/270, 275

[56] References Cited

U.S. PATENT DOCUMENTS

| | | | |
|---|---|---|---|
| 5,208,897 | 5/1993 | Hutchins | 704/270 |
| 5,519,641 | 5/1996 | Beers et al. | 364/514 |
| 5,630,175 | 5/1997 | Gajewski et al. | 395/892 |
| 5,715,369 | 2/1998 | Spoltman et al. | 395/2.79 |
| 5,822,718 | 10/1998 | Bakis et al. | 702/180 |

OTHER PUBLICATIONS

Mosely Lonnie E., Boodey David M., Mastering Microsoft Office 97, Sybex, pp. 42, 86, 87, Dec. 1996.

*Primary Examiner*—David R. Hudspeth
*Assistant Examiner*—Robert Louis Sax
*Attorney, Agent, or Firm*—Quarles & Brady LLP

[57] ABSTRACT

A method for configuring an audio interface for a voice recognition application in a computer system comprises the steps of: (a) displaying a first graphical user interface having a message prompting a user to initiate testing of a microphone connection, a user activatable button and at least one icon representing recording status; (b) in response to activation of the button: (1) modifying the message section to instruct the user to remain silent; (2) recording background noise through the microphone; (3) initiating an animation of the at least one icon to represent an active recording status; and, (4) terminating the background noise recording and the animation of the at least one icon; (c) upon termination of the background noise recording: (1) modifying the message to instruct the user to speak into the microphone; (2) recording the user speaking through the microphone; (3) reinitiating the animation of the at least one icon; (4) terminating the recording of the user speaking and the animation of the icon; and, (d) processing the recordings of the background noise and the user speaking.

13 Claims, 45 Drawing Sheets

172

Test Microphone Setup

There are two possible ways to connect your microphone to your computer.

1. Without an adapter

2. With a Battery Adapter

OK

174

Test Microphone Setup

There are three possible ways to connect your microphone to your computer.

1. Without an adapter

2. With a Power Adapter

3. With a Battery Adapter

OK

CONFIGURING AN AUDIO INTERFACE WITH BACKGROUND NOISE AND SPEECH

BACKGROUND OF THE INVENTION

1. Field of the Invention

The invention relates to the field of configuring microphones and audio systems in computer systems, and in particular, to a method and graphical user interface for configuring one or more microphones, one or more speakers, one or more sound cards and one or more audio mixers for use with a speech recognition application.

2. Description of Related Art

The use of microphones in connection with personal computers has increased in popularity due to the advent of inexpensive multimedia computers and sophisticated applications like collaboration on the Internet, telephony and speech recognition.

Proper microphone connection and audio settings are among the most important elements in achieving required performance from the audio components of a computer, especially for speech recognition. Tools that help unskilled users properly configure and adjust their microphone and audio settings are important differentiators for these types of applications.

SUMMARY OF THE INVENTION

The inventive arrangements taught herein provide numerous advantages in simplifying configuring an audio interface for a speech recognition application, particularly for connecting and adjusting one or more microphones and one or more audio output speakers. The microphone and speaker setup taught herein can be used for other applications as well. This inventive arrangements simplify and expedite setting up an audio interface in the following ways.

Step by step instructions are provided for connecting a microphone to various audio systems. The audio input is tested to determine that the microphone is properly configured, in both power and signal parameters, to provide proper audio input and output.

Program flow is adapted depending on selection of the audio output device, the microphone, the number of compatible sound cards and whether any microphone connection adapters are available.

The microphone configuration and adjustments are designed to work with and for either dynamic and electret types of microphones.

Comparing background noise levels to speech levels allows operation over a wide range of microphones and audio systems.

The audio mixer is configured for speech recognition by selecting and adjusting microphone inputs, while at the same time, deselecting inputs and outputs as specific to each configuration that would otherwise interfere with microphone operation.

Multiple audio cards are supported, allowing the user to select between one or more audio cards for input and output. Mixer adjustments are based on the audio card selection, and for each card separately.

Sound cards are tested in the system to insure that only those sound cards that meet the minimum requirements to support the speech application are listed for selection by the user.

The program flow is modified after the first time through the microphone configuration process. Subsequent runs allow the user to bypass the microphone hardware configuration tests and go directly to the audio mixer adjustments.

Graphic user interfaces and associated displays are designed to be easily configured for different combinations of microphone and manufacture-specific information.

A method for configuring an audio interface for a voice recognition application in a computer system in accordance with an inventive arrangement comprises the steps of: (a) displaying a first graphical user interface having a message prompting a user to initiate testing of a microphone connection, a user activatable button and at least one icon representing recording status; (b) in response to activation of the button: (1) modifying the message section to instruct the user to remain silent; (2) recording background noise through the microphone; (3) initiating an animation of the at least one icon to represent an active recording status; and, (4) terminating the background noise recording and the animation of the at least one icon; (c) upon termination of the background noise recording: (1) modifying the message to instruct the user to speak into the microphone; (2) recording the user speaking through the microphone; (3) reinitiating the animation of the at least one icon; (4) terminating the recording of the user speaking and the animation of the icon; and, (d) processing the recordings of the background noise and the user speaking.

The method can further comprise the step of: (e) upon successful processing of the recordings, modifying the message section to indicate the successful termination of the microphone connection testing.

The method can still further comprise the steps of: (f) upon unsuccessful processing of the recordings, modifying the message section to indicate the unsuccessful termination of the microphone connection testing; and, (g) prompting the user to initiate re-testing of the microphone testing; and (h) upon initiation of the re-testing, repeating steps (b) through (d).

The method can yet further comprise the steps of: (f) upon unsuccessful processing of the recordings, modifying the message section to indicate the unsuccessful termination of the microphone connection testing; and, (g) prompting the user to initiate re-testing of the microphone testing; and, (h) upon initiation of the re-testing, repeating steps (b) through (d).

Alternatively, the method can further comprise the steps of: (e) upon unsuccessful processing of the recordings, modifying the message section to indicate the unsuccessful termination of the microphone connection testing; and, (f) prompting the user to initiate re-testing of the microphone testing; and, (g) upon initiation of the re-testing, repeating steps (b) through (d).

In either alternative, the method can comprise the step of representing the recording status with the at least one icon representing a tape recorder, the step of representing the recording status with the at least one icon representing a volume meter; or, the step of representing the recording status with a first icon representing a tape recorder and with a second icon representing a volume meter.

BRIEF DESCRIPTION OF THE DRAWINGS

There are shown in the drawings forms which are presently preferred. It should be understood, however, that the inventive arrangements are not limited to the precise arrangements and instrumentalities shown.

DETAILED DESCRIPTION OF THE PREFERRED EMBODIMENTS

Figure 1:
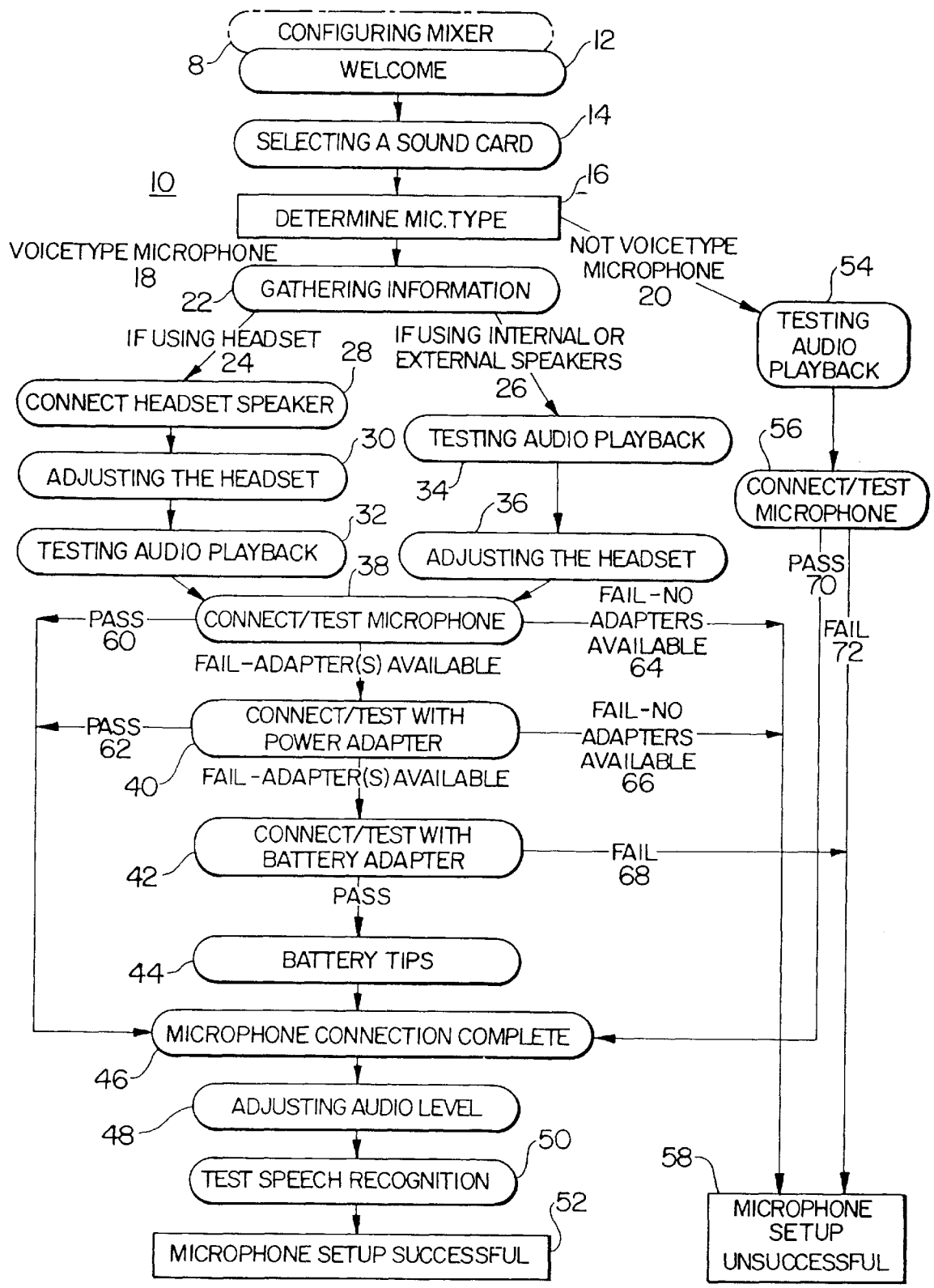
FIG. 1 is a flow chart of a method, according to the inventive arrangements taught herein, for configuring an audio interface for a speech recognition application in a computer system.

FIG. 1 a flow chart of a method, according to the inventive arrangements taught herein, for configuring an audio interface for a speech recognition application, or program, in a computer system. The flow chart represents an automated sequence of controls referred to as a Wizard in one or more commercial products embodying the inventive arrangements. The commercial products are the ViaVoice, VoiceType and IBM Simply Speaking speech recognition programs, available from IBM. ViaVoice, VoiceType, IBM Simply Speaking and IBM are trademarks of International Business Machines corporation. The Wizard, which represents a tool, may be conveniently thought of as an intermediary or representative of the speech recognition application that guides a user through the configuring process in a thorough, efficient and user-friendly manner. Of course, the Wizard is part of the speech recognition application itself. FIGS. 2–48 represent so-called screen shots from one or more of the commercial products, that is, snapshots or downloads of graphical user interface monitor screen displays associated with different steps and parts of the flow chart shown in FIG. 1. The screen shots in the program are protected by copyright. Copyright notices are found in the applications but are omitted from the drawings herein. The inventive arrangements, therefore, must be recognized as comprising various steps of the method illustrated by the flow chart, various ones of the graphical user interface displays, various sequences of the steps and of the graphical user interface displays and various combinations thereof. The inventive arrangements also comprise computer systems programmed with a routine set of instructions stored in a physical medium for implementing the various steps, graphical user interface displays, sequences and combinations thereof.

The flow chart in FIG. 1 illustrates the reasoning behind the sequencing of the method steps and graphical user interface displays, and conveys a high level view of the configuring process for the speech recognition application. It is impractical to show all of the possible permutations and combinations that may occur, or show all of the possible error scenarios that may result in displaying various pop-up dialogs. Accordingly, it will be appreciated that the flow chart and the graphical user interface displays shown in the drawings are representative and need not be precisely as shown in order to fall within the ambit of the inventive arrangements taught herein.

Many of the graphical user interface (GUI) displays shown herein have a first set of five icons representing so-called user activatable buttons, which the user can use to navigate through the application and the associated tool. A first of these buttons is designated Back, for repeating a step. A second of these buttons is designated Next for moving on to a following step. A third of these buttons is designated Cancel, for undoing a step in process, or in some cases, exiting from the application. A fourth button is designated Help, for initiating a help tool or utility. A fifth button is designated Finish, which can be used to accept the new settings made in accordance with the inventive arrangements. Only four of the buttons are used at the same time, the Finish button replacing the Next button when the Finish button is displayed.

Other GUI displays have a second set of two buttons user activatable buttons, which are used for enabling a user to accept a certain condition, situation or status. A first of these buttons is designated OK, for accepting the certain condition, situation or status. A second of these buttons is designated Help, for initiating a help tool or utility. The functions of these buttons will not be explained again in the following descriptions of the GUI displays shown in the drawings.

With reference to FIG. 1, the flow chart represents a multi-path process 10. Generally, only those arrows connecting the various blocks that represent alternate decision paths are identified by reference numerals. The remaining paths are not so identified, except as noted. In broad terms, the method assures proper selection, connection and adjustment of sound cards, microphones, microphone adapters, speakers and audio mixers, all of which represent part of an audio interface for the speech recognition application, in a manner that is optimally compatible with operation of the speech recognition application. It is that part of the speech recognition application relating to this optimization that is embodied in the inventive arrangements taught herein. Speech recognition, in and of itself, is beyond the scope of this disclosure.

Figure 2:
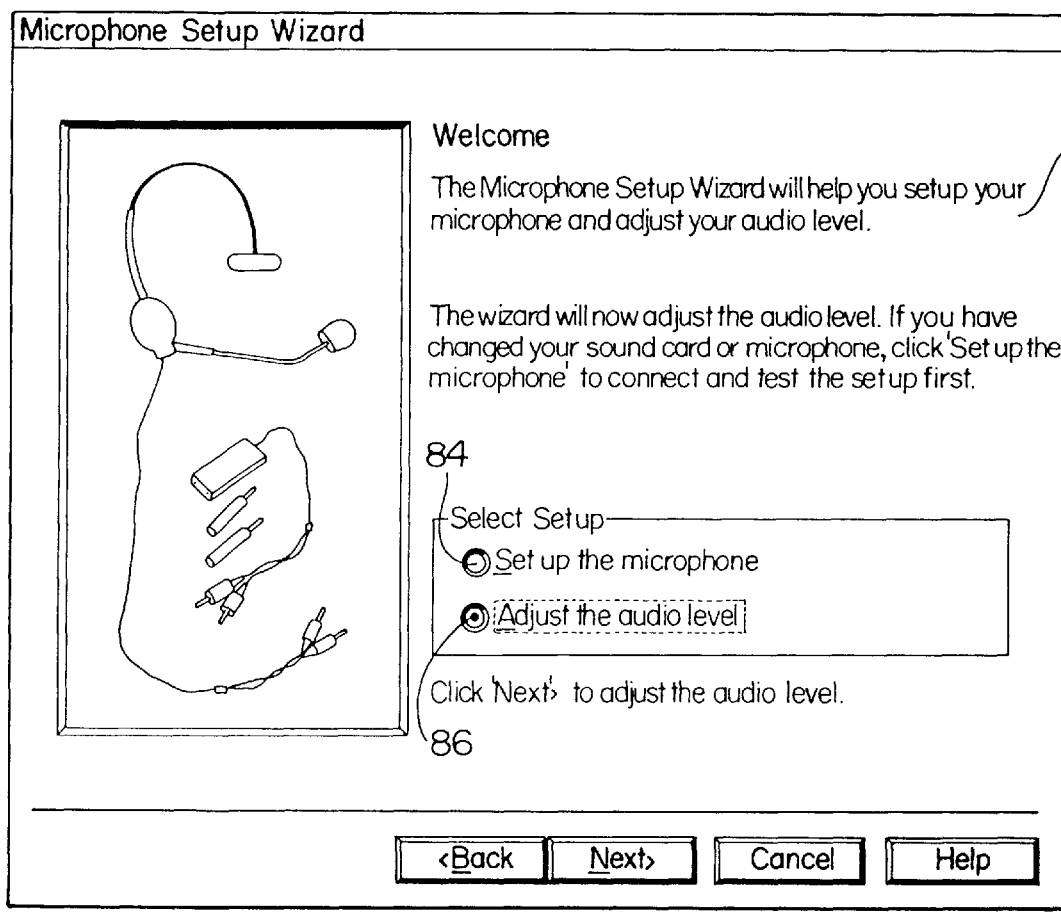
FIG. 2 is an exemplary screen display for a graphical user interface useful for welcoming a user to a microphone setup process according to the inventive arrangements.

The second block 12 is the first step perceived by a user and represents the step of displaying a graphical user interface for welcoming the user to the speech recognition application, hereinafter referred to as the application. The GUI display 80 representing a Welcome page, shown in FIG. 2, presents some general information and informs the user of the purpose of the Wizard tool. The GUI display 80 includes a message section 82 explaining the microphone set up and at least two user activatable icons, for example so-called radio buttons 84 and 86. The message prompts the user to select one of two options by activating one of the icons. The options include setting up the microphone to be used for speech recognition and adjusting the audio level of the words to be recorded and processed by the application.

At the same time, the tool will be gathering information by querying the audio device driver for the sound card capabilities, setting up audio mixer controls and identifying all sound cards in the computer system and determining which of those sound cards, if any, is compatible with the application. Prior to the welcome step, or during part of the time the welcoming step is undertaken, the audio mixer is initially configured in accordance with step of block 8. Without any interface with the user, and depending on the type of audio mixer, the tool deselects or mutes the microphone playback mixer control and all recording mixer controls other than the master and microphone controls. The tool then adjusts both the master and microphone volume controls to maximum. This is the starting point for the various tests which follow.

Figure 3:
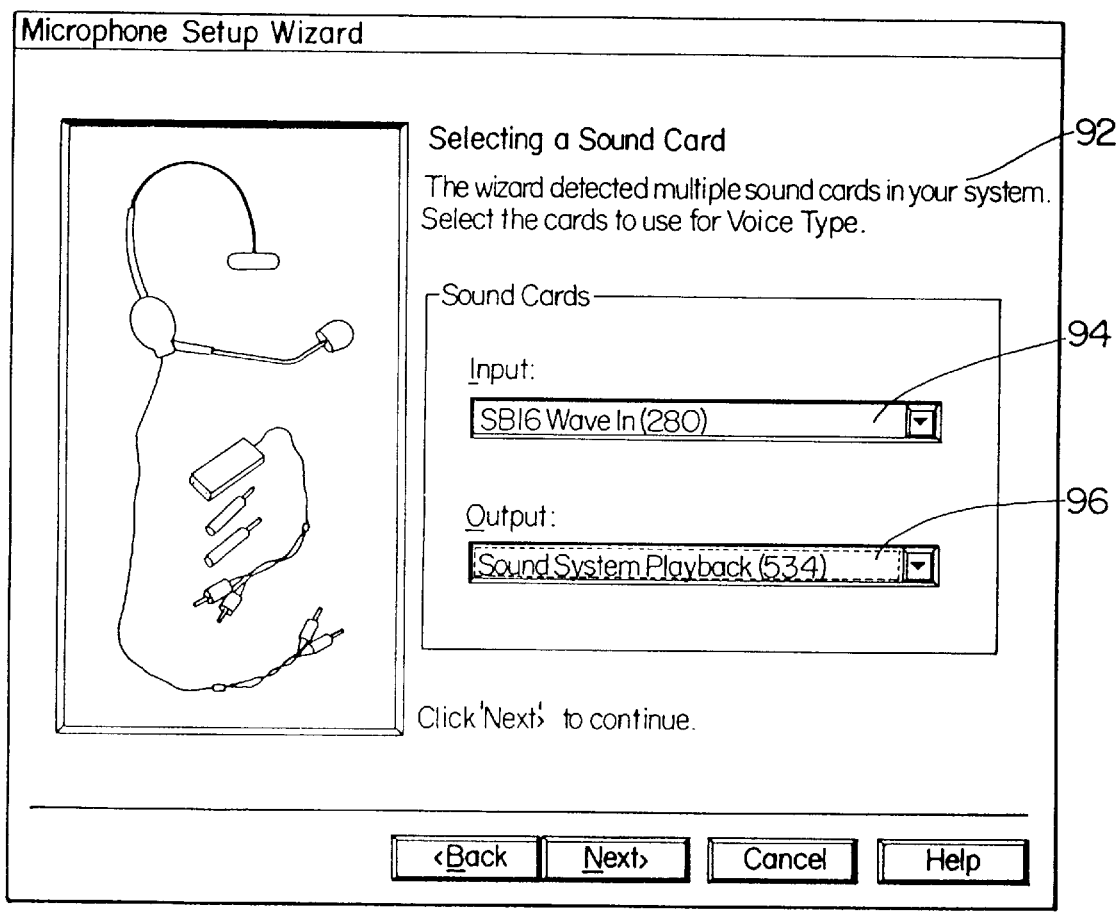
FIG. 3 is an exemplary screen display for a graphical user interface useful for selecting a sound card.
Figure 4:
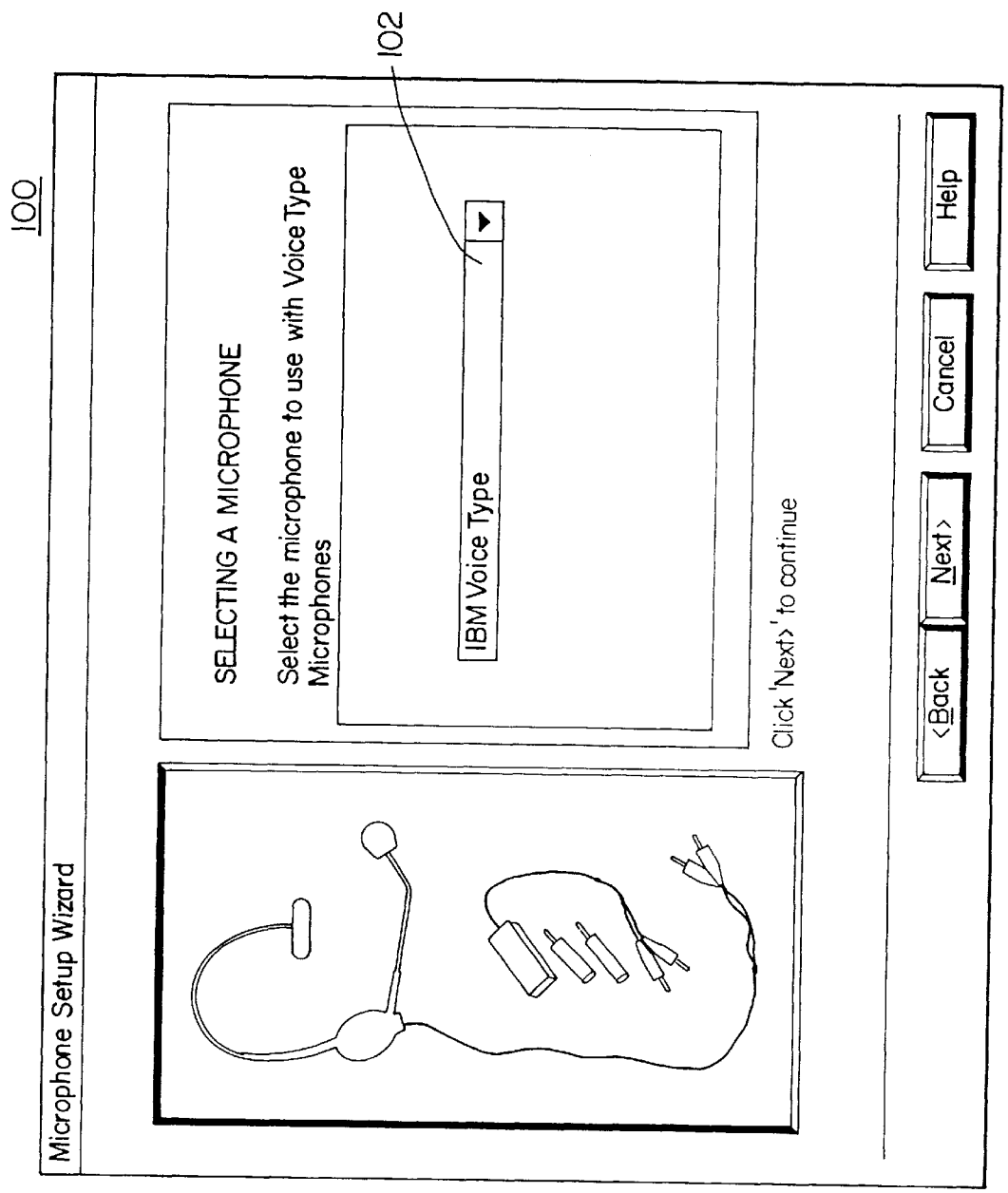
FIG. 4 is an exemplary screen display for a graphical user interface useful for selecting a microphone type.

If more than one sound card in the computer system is determined to be speech capable, a GUI display 90 as shown in FIG. 3 is generated, corresponding to block 14, which can replace GUI display 80 on the screen.

GUI display 90 includes a message section 92 identifying selection of a sound card for input and output as the immediate task for the user, as well as a first drop-down list 94 of those sound cards available for the input of audio signals and a second drop-down list 96 of those sound cards available for the output of audio signals. In accordance with the capabilities of the application and of the associated tool, the same or different sound cards can be selected for the input and output of audio signals. Once the sound cards have been selected, the GUI display 90 is replaced by the Welcome page of GUI display 80. It will be appreciated that the sound card selecting step 14 can precede the welcome step 12, and that GUI display 90 can be formulated as an initial screen.

In the event only one suitable sound card is determined to be present, it must be used for both the input and the output audio signals, and accordingly, no user interaction is required and no provision is made for user interaction. In fact, the user need not even be aware that selecting between multiple cards is an issue, so that avoiding even raising the issue if unnecessary is an operational advantage of the inventive arrangements. In this circumstance, sound card selecting step 14 is omitted.

Returning to GUI display 80, irrespective of the sound card selecting step, a user unsophisticated in computer systems and speech recognition applications cannot reasonably be assumed to be aware that setting up the microphone is a prerequisite to adjusting the audio level. In accordance with another operational advantage of the inventive arrangements, the tool determines from a data storage registry of the application whether a microphone operatively associated with the application has been previously successfully set up. If not, the audio level button 86 is deactivated and, for example, grayed in appearance as is common for unavailable options. This leaves the user with no choice other than activating button 84 to initiate setting up the microphone. If the registry indicates that a microphone has previously been successfully set up, then the user can activate either of the buttons 84 and 86 to initiate either one of the microphone set up or the audio level adjustment. A user might choose to the microphone set up a second time if a new microphone has been installed or if previous operation was deemed to be unsatisfactory.

The actual updating of registry entries in the application occurs at two points in the process. The first point is after the microphone connection has been successfully tested, in block 46, so that the user can exit from the application, if desired, without having to connect and test the microphone again when the application is next used. The second point is after the microphone setup has successfully concluded, in block 52.

After the welcome step 12, and the sound card selecting step 14, if necessary, the type of microphone must be determined in step 16. A GUI display 100 provides a drop-down list 102 of possible microphones, one of which must be selected by the user. If the microphone is one which has been manufactured specifically for use with, and packaged with the application, referred to herein as a VoiceType microphone, the method proceeds on path 18 to the gathering information step 22. A VoiceType microphone is part of a headset assembly, illustrated for example in FIG. 4 and many other Figures, which also includes an ear piece. The cable associated with the headset includes separate plugs for the microphone and for the ear piece. The cables must be attached separately and may require different procedures and adapters. The microphone and the ear piece will also require separate tests and adjustments. If the microphone is not a VoiceType microphone, the flow chart branches on path 20 to blocks 54 and 56 in succession. This path will be described later.

Figure 5:
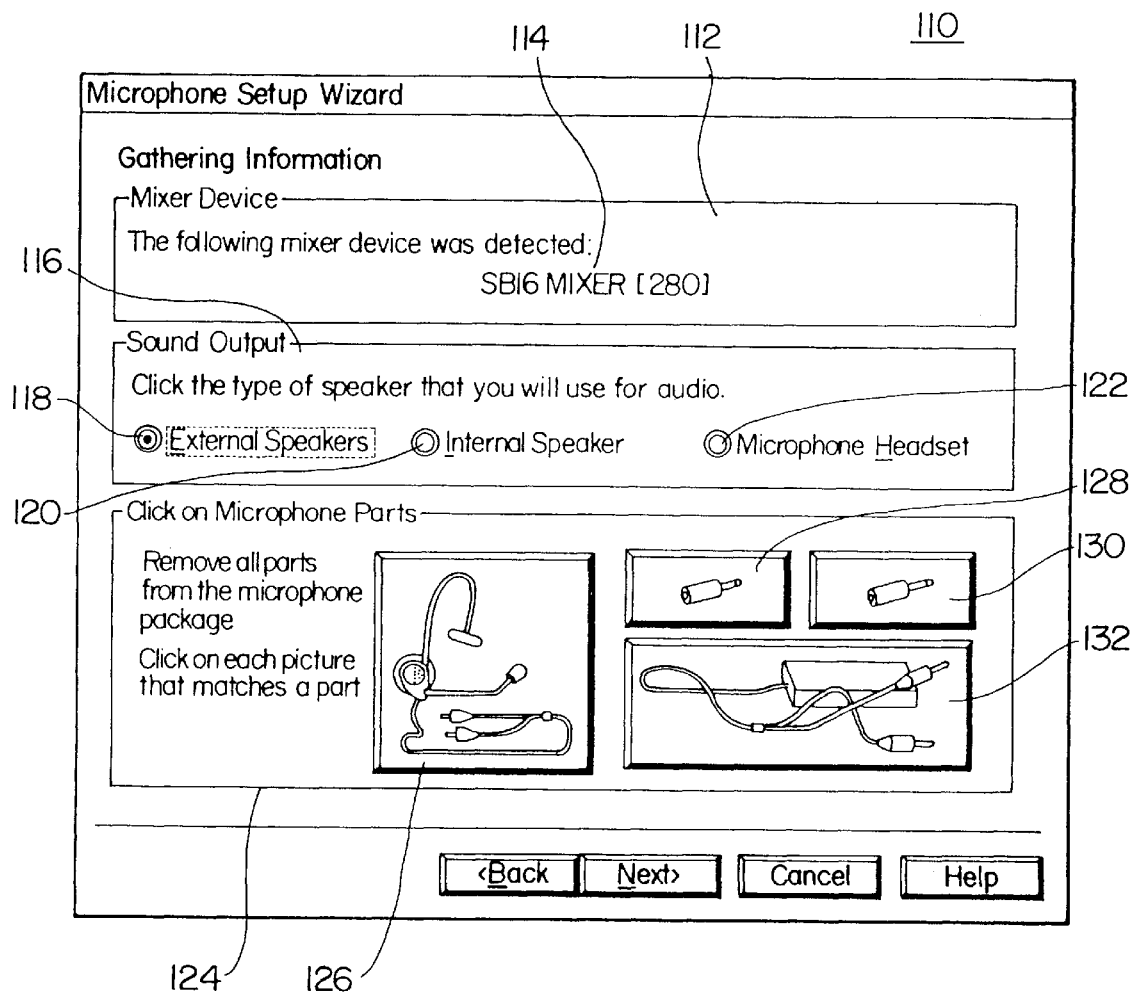
FIG. 5 is an exemplary screen display for a graphical user interface useful for gathering information on microphone parts, with no parts selected.
Figure 6:
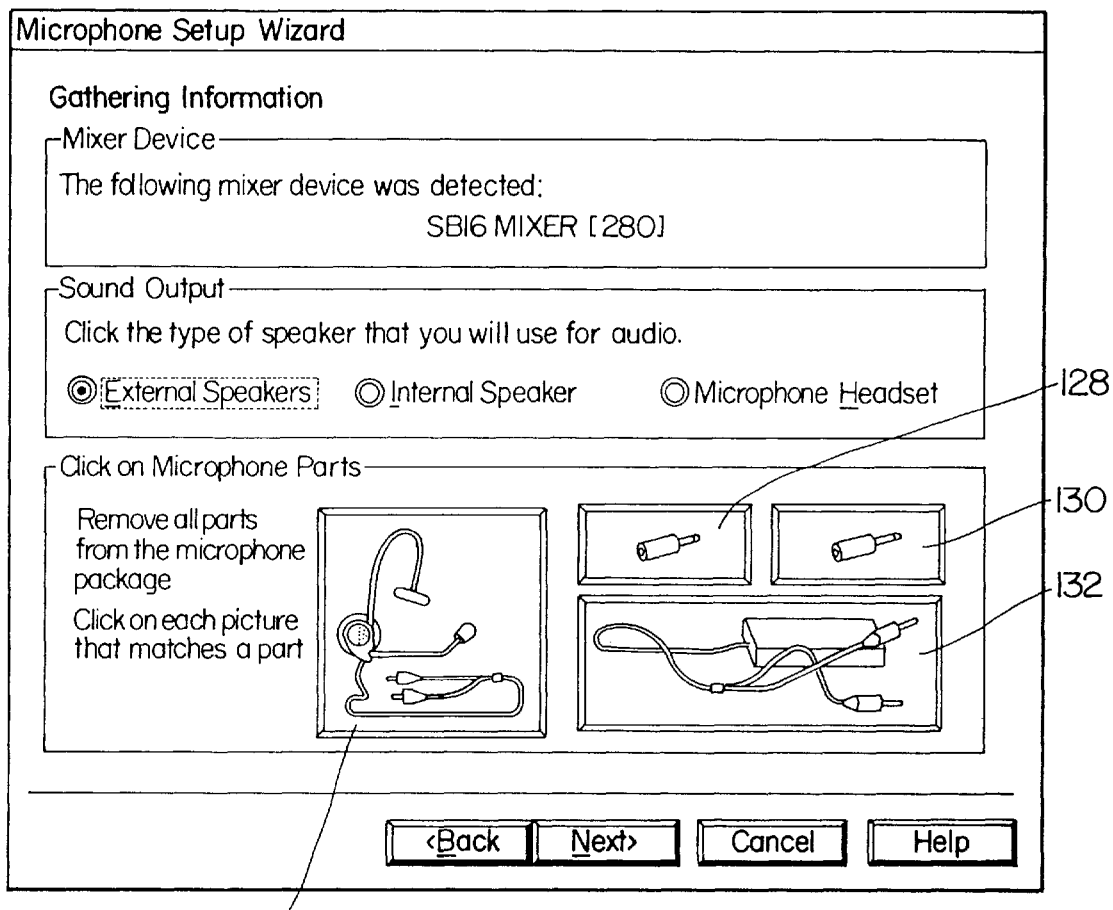
FIG. 6 is the exemplary screen display for a graphical user interface as shown in FIG. 5, but with all microphone parts selected.

The gathering information step is implemented by a GUI display 110, shown in FIGS. 5 and 6. The tool will display the gathering information display 110 when the user clicks Next if the user has selected VoiceType microphone in step 16. This display is be used to gather any additional information that the user can provide. This information aids in determining which branches of the flow chart 10 will be followed. FIG. 5 shows a screen shot without any adapters selected and FIG. 6 shows a screen shot with all of the adapters selected.

The static text field 114 in the Mixer Device group box 112 identifies the audio mixer device that the tool will be using. The name returned from the mixer device driver is displayed in this field. A set 116 of three radio buttons 118, 120 and 122 is used to customize any microphone setup diagrams that may be displayed in later screens. Buttons 118, 120 and 122 also have an impact on the order and content of additional screens that can be added. Button 118 is for selecting external speakers. Button 120 is for selecting an internal speaker or speakers. Button 122 is for selecting a microphone headset, which includes at least one ear piece. A user selecting internal or external speakers can use the tool to test the audio playback, as explained later. A user selecting external or internal speakers can still choose to use a microphone that is part of a headset, without reliance on the ear piece associated with the headset. These represent some of the combinations and permutations that are too numerous to explain and illustrate in detail, but will be understood by those skilled in the art.

A third section 124 includes buttons with symbols representing different parts, at least some of which are packaged with each application. These include a headset button 126, a signal adapter button 128, a power adapter button 130 and a battery adapter button 132. The signal adapter is a signal strength attenuator having, for example, a ratio of 4:1. Some microphones require power at their tips and others require power at their ring. Some sound cards provide power to the ring of a microphone connected thereto and others provide power to the tip. Some VoiceType microphones require power to the tip. Sound cards of the Sound Blaster type supply power to the ring. Sound Blaster is a trademark of Creative Technology, Ltd. For use with such cards, the power adapter changes the power from the ring to the tip. Some sound cards do not supply power at all for microphones or do not supply enough power for microphones. The battery adapter can supply such power when such sound cards are used.

The graphic push buttons are therefore used to help identify what adapters may have been shipped with the VoiceType microphone. This is an elegant solution to the problem of the tool not knowing what kind of microphone headset was shipped with the user's particular version of the application. Future versions of the application might ship with a customized microphone that works with a particular sound card, requiring no adapters or a microphone similar to the one that shipped with a microphone shipped with three different adapters. This can influence the flow of successive steps, as explained in the following example.

The user is prompted to unpack the headset and all of the parts packaged therewith and to select each button corresponding to a supplied part. If the tool determines, for example, that the computer is equipped with a Sound Blaster type sound card and the user indicates that all the displayed extra components are available, as shown in FIG. 6, or indicates that at least the power adapter is available, then a subsequent Test With Power Adapter step in block 40 is advantageously implemented before a Test Without An Adapter step in block 38 and before a Test With Battery Adapter step in block 42, because most Sound Blaster type sound cards are known to require the power adapter, and the tool is programmed with this information.

If the user selected either internal or external speakers, the method branches on path 26 to a testing audio playback step and an adjusting the headset step in blocks 34 and 36 successively. These steps will be explained in detail later.

Figure 7:
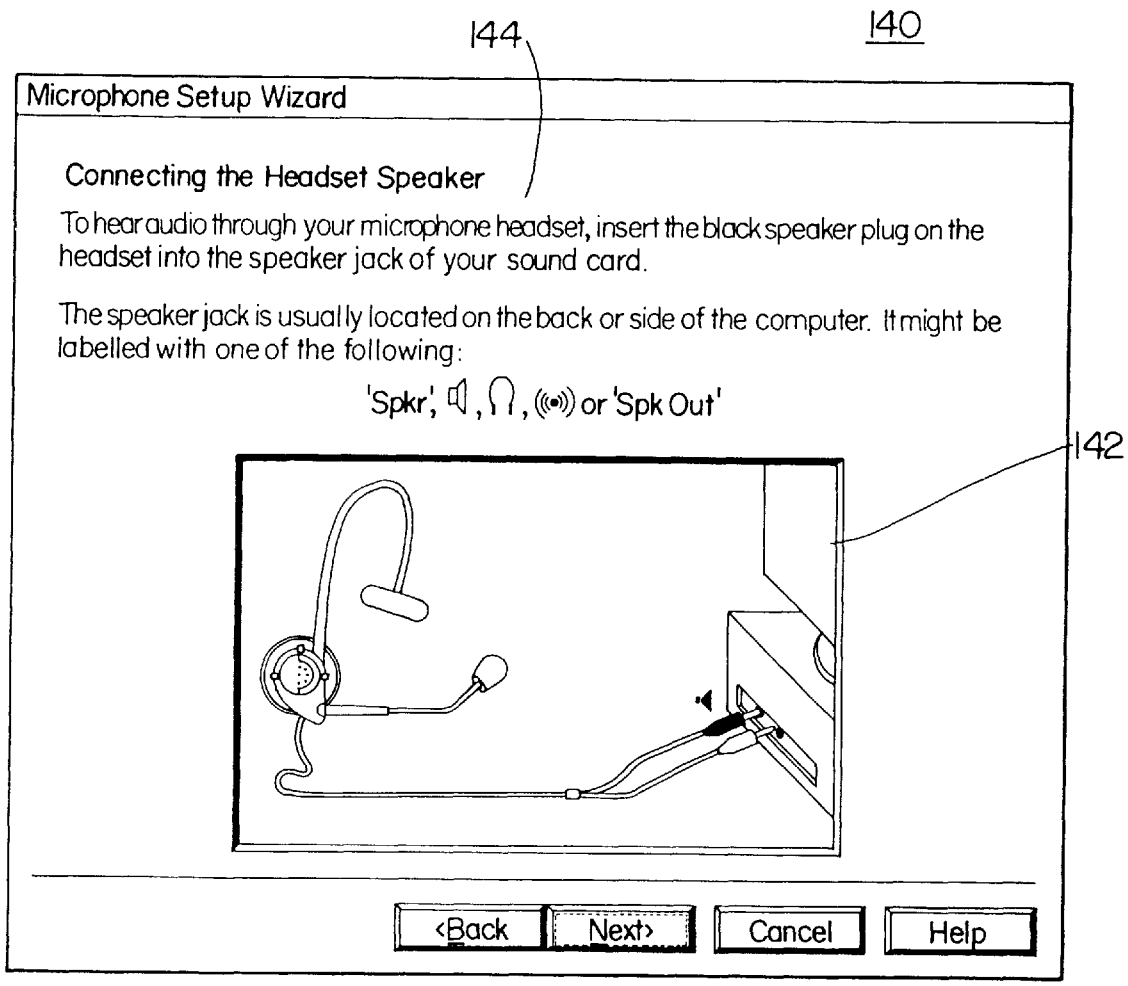
FIG. 7 is an exemplary screen display for a graphical user interface useful for connecting the headset speaker plug to the computer system.
Figure 8:
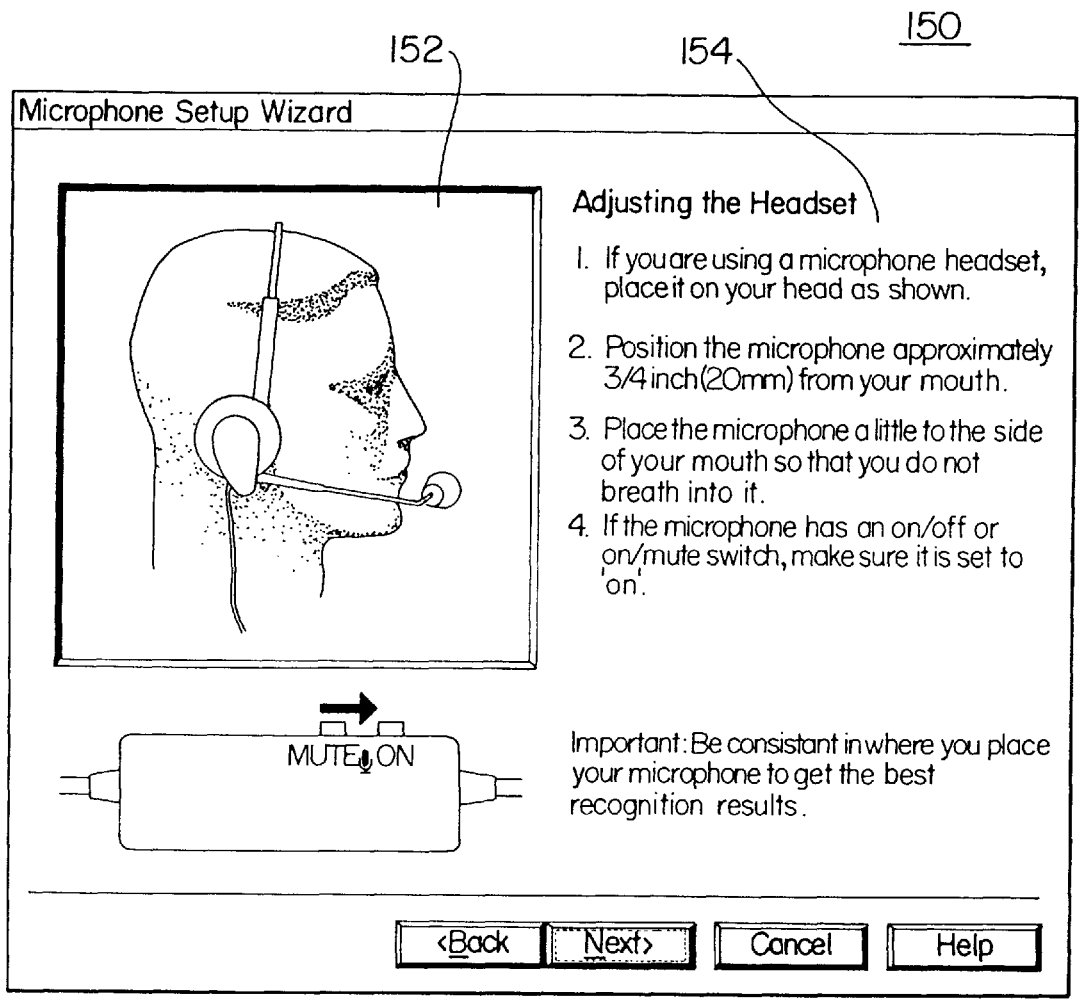
FIG. 8 is an exemplary screen display for a graphical user interface useful for instructing a user in positioning and adjusting the headset.
Figure 9:
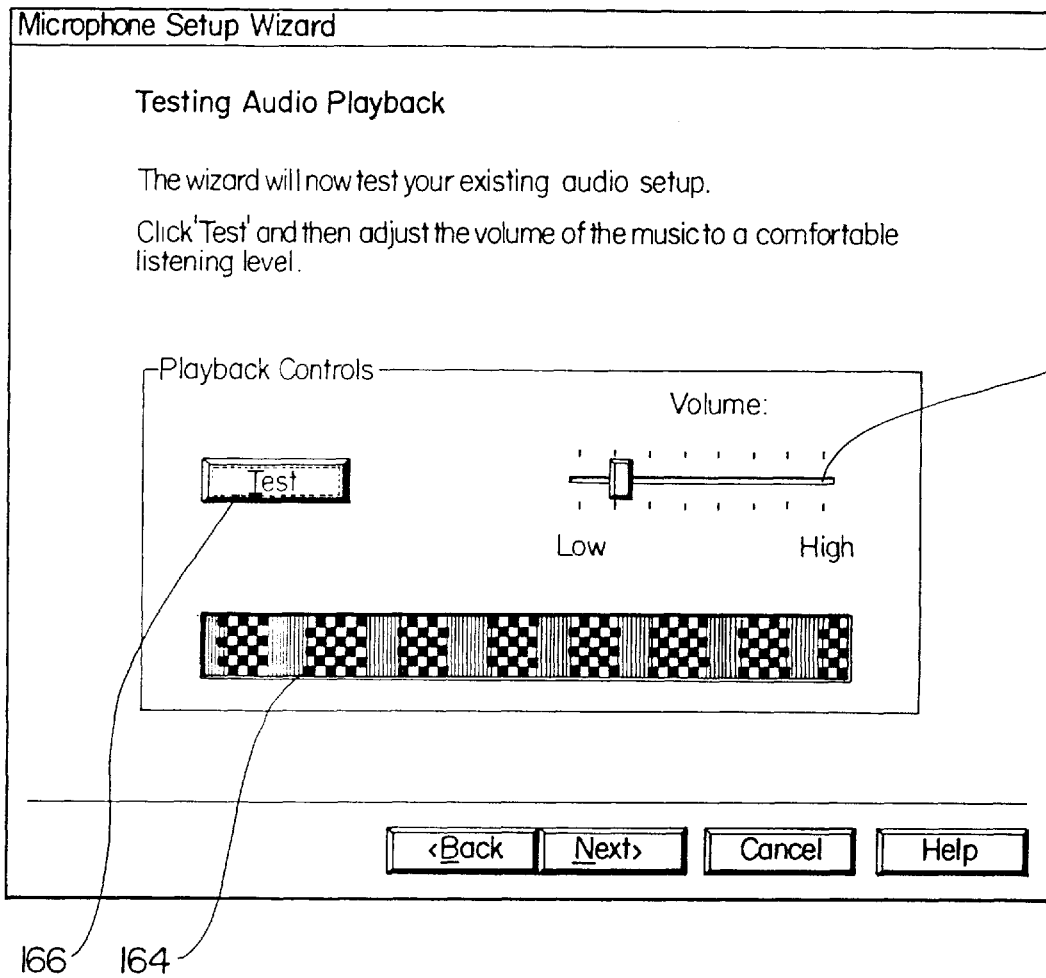
FIG. 9 is an exemplary screen display for a graphical user interface useful for testing audio playback.
Figure 10:
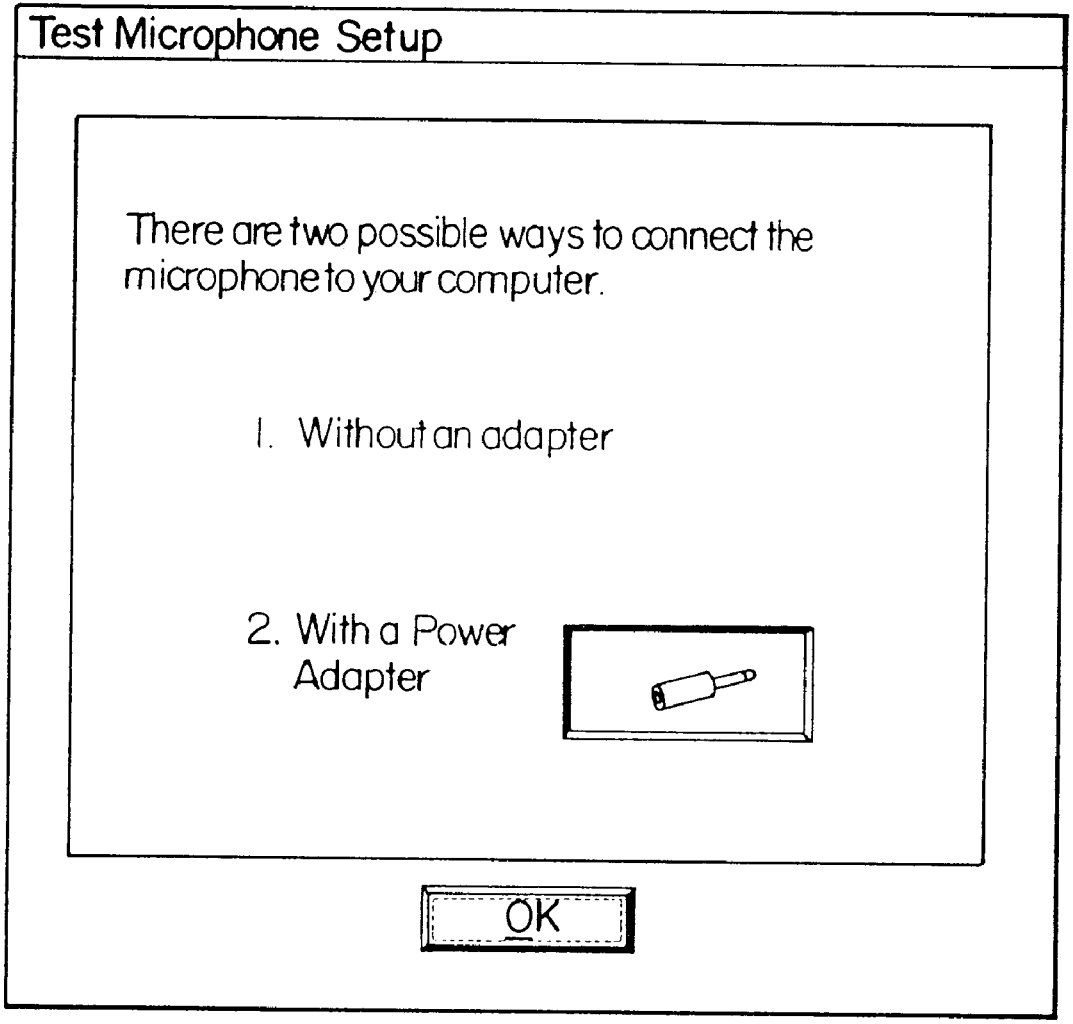
FIG. 10 is an exemplary screen display for a graphical user interface useful for explaining a first set of microphone connections.
Figure 11:
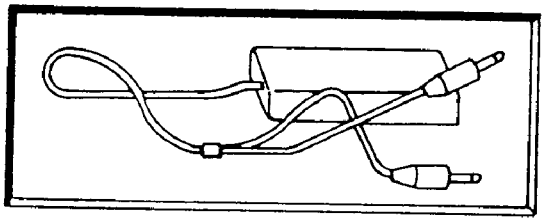
FIG. 11 is an exemplary screen display for a graphical user interface useful for explaining a second set of microphone connections
Figure 12:
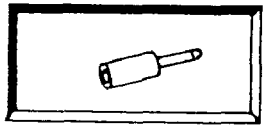
FIG. 12 is an exemplary screen display for a graphical user interface useful for explaining a third set of microphone connections.
Figure 12:
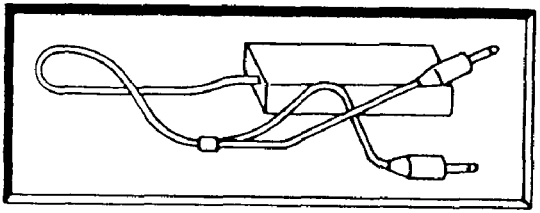

If the user selected the headset as the sound output device, the method branches on path 24 to a connect the headset speaker step in block 28. A GUI display 140 shown in FIG. 7 provides a picture 142 and text 144 embodying instructions for correctly plugging in the headset to the computer system. The plug for the microphone, which is brightly colored in other displays, for example green, is grayed to reduce confusion and emphasize the black speaker plug.

It cannot be assumed that all users are familiar with wearing headsets. Accordingly, the step in block 30 generates a GUI display 150, shown in FIG. 8, which provides a picture 152 and text 154 embodying instructions for properly wearing and mechanically adjusting the headset. The picture 152 shows headset placement and mouth positioning. On-line Help is available by pressing the Help button if the user needs additional instruction. Alternatively, an animation sequence can be provided, demonstrating the whole procedure.

After the headset has been adjusted, audio playback can be tested in the step of block 32. A GUI display 160 shown in FIG. 9 includes a user operable volume control 162, an animation sequence 164 and a user activatable button 166. GUI display 160 allows the user to set the audio output volume level to a comfortable level. Once the Test button 166 is pressed, audio will start playing. The button text will change to Stop, and the animation sequence 164 will begin. The animation sequence is provided to give a visual indication that something is going on, in the event the user may not be able to hear the audio being played, which can happen for a variety of reasons. If the user hits the Stop button or the audio plays to completion, the dialog text will be updated, the Stop text will change to Re-Test and the animation sequence will stop. If the user heard the audio test, and is satisfied with the volume level, the user is instructed to press the Next button. Otherwise the user is instructed to press the Help button for additional information.

Unseen to the user, the tool adjusts the master volume to maximum, makes sure that the waveout is not muted and sets the waveout volume to either the value in a Play Level registry entry of the application or the current waveout mixer volume control, if the registry entry is corrupted. If applicable, the microphone mixer controls are muted for playback. The master mixer control and the wave out mixer control are not muted, or are selected, depending on the type of audio mixer.

The branch beginning with path 24 terminates at the connect and test microphone step of block 38, as does the branch beginning with path 26. The testing audio playback step in block 34 is identical to the testing audio playback step in block 32, except that is the internal or external speakers that are being tested, and accordingly, the headset speaker is of no concern, with regard to placement of the operation of the ear piece, which is not connected. Icons or pictures representative of the headset need not be a part of any GUI display associated with the step of block 34. No GUI display for this step in block 34 is necessary. However, since a VoiceType microphone was selected to reach path 18, the tool expects the microphone part of the headset to be utilized, even if the ear piece is not utilized. Accordingly, the headset is adjusted in the following step of block 36, so that the microphone of the headset will be properly positioned for connecting and testing the microphone in following block 38. In block 38 the branches of the flow chart that diverged from the gathering information step of block 22 join back together.

The testing audio playback step of block 54 is associated with use of a microphone that is not a VoiceType microphone. However, this microphone selection is independent of the choice of a headset or internal/external speakers in the step of block 22. Accordingly, the testing audio playback step of block 54 is the same as the steps in blocks 32 or 34, depending on the user selection of an audio output device.

Inasmuch as the tool has no access to information regarding the nature of the microphone tested for audio playback in the step of block 54, the next step thereafter is to connect and test the microphone in the step of block 56. Connecting and testing the microphone will be explained in connection with the identical step of block 38.

In the connecting and testing microphone steps, blocks 38, 40 and 42 represent three connection sequences, namely: the microphone alone; the microphone with a power adapter; and, the microphone with a battery adapter. For each of these connection sequences, the user is presented with a pair of screens to help the user test that sequence. The first screen of each pair describes to the user how to connect the microphone with or without the adapter appropriate for the test. The second screen leads the user through the phases of the test. Within each sequence of each of the blocks 38, 40 and 42 the user tests various microphone configurations through the series of paired test screens. The configurations correspond to the selected audio output device, and include the headset configuration, the external speaker configuration and the internal speaker configuration. In the flow chart, the order of connection sequences is first the microphone alone, secondly the microphone with a power adapter and thirdly the microphone with a battery adapter.

The order of these steps in the flow chart has been found to be the most efficient sequence under most circumstances. However, it must be remembered that the tool is capable of changing this sequence under certain circumstances. For example, and as explained in more detail above, if the tool determines that the computer is equipped with a Sound Blaster type sound card and the user indicates that a power adapter is available, then the test with power adapter step in block 40 is advantageously implemented as the first of the three connection sequences because most Sound Blaster type sound cards are known to require the power adapter. Generating GUI displays for connecting unneeded components is also advantageously avoided. Successful completion of the connection and testing in block 40 under these circumstances makes it unnecessary for the steps of blocks 38 and 42 to be implemented.

In the steps of block 38, the microphone must be connected before the microphone connection can be tested. The user is reminded of connection options prior to connecting the microphone. If the user has identified a power adapter, but not a battery adapter, in the information gathering step, a GUI display 170 shown in FIG. 10 will be generated. If the user has identified a battery adapter, but not a power adapter, in the information gathering step, a GUI display 172 shown in FIG. 11 will be generated. If the user has identified both a power adapter and a battery adapter in the information gathering step, a GUI display 174 shown in FIG. 12 will be generated.

Figure 13:
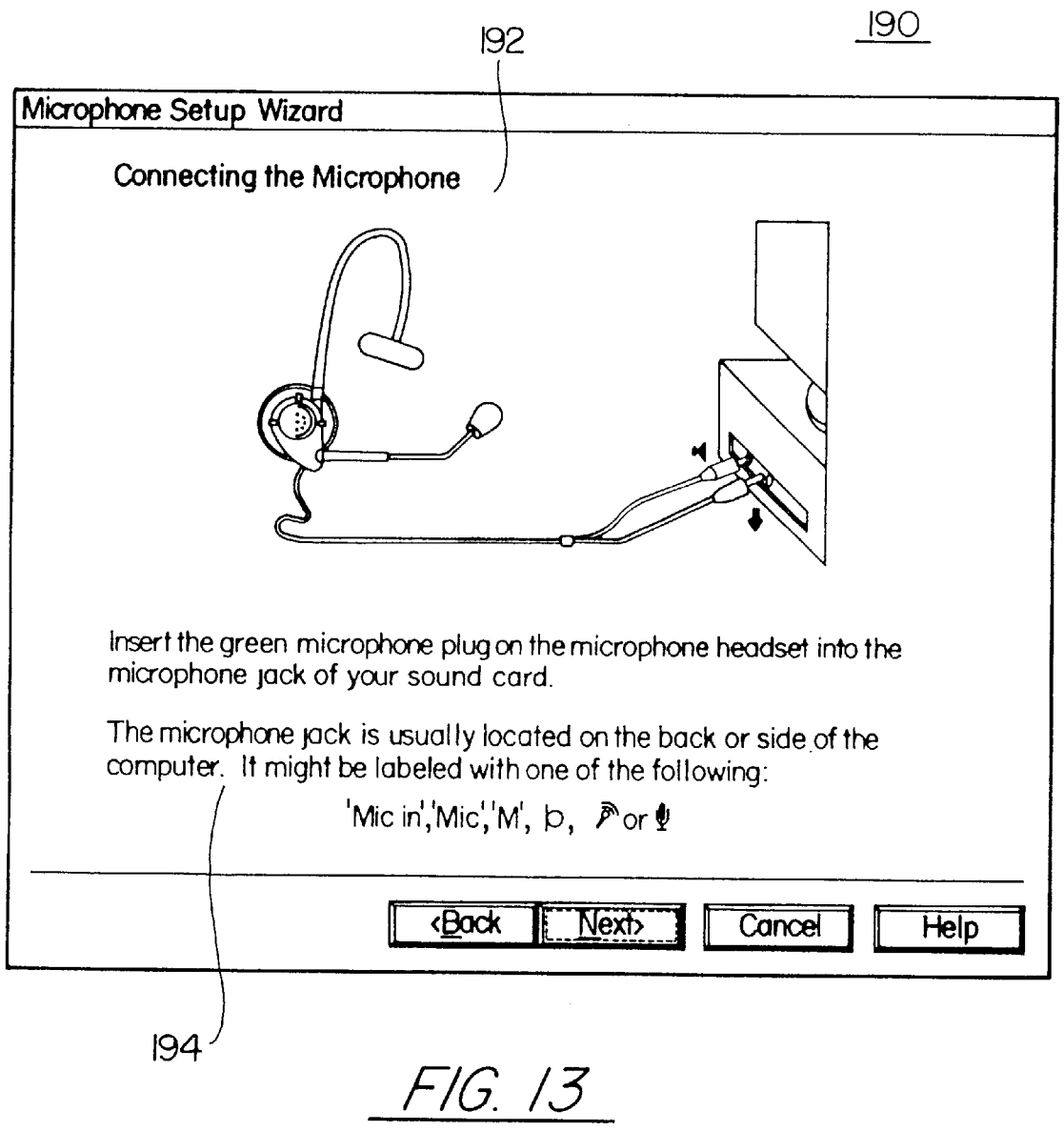
FIG. 13 is an exemplary screen display for a graphical user interface useful for illustrating the connection in a headset speaker configuration.
Figure 14:
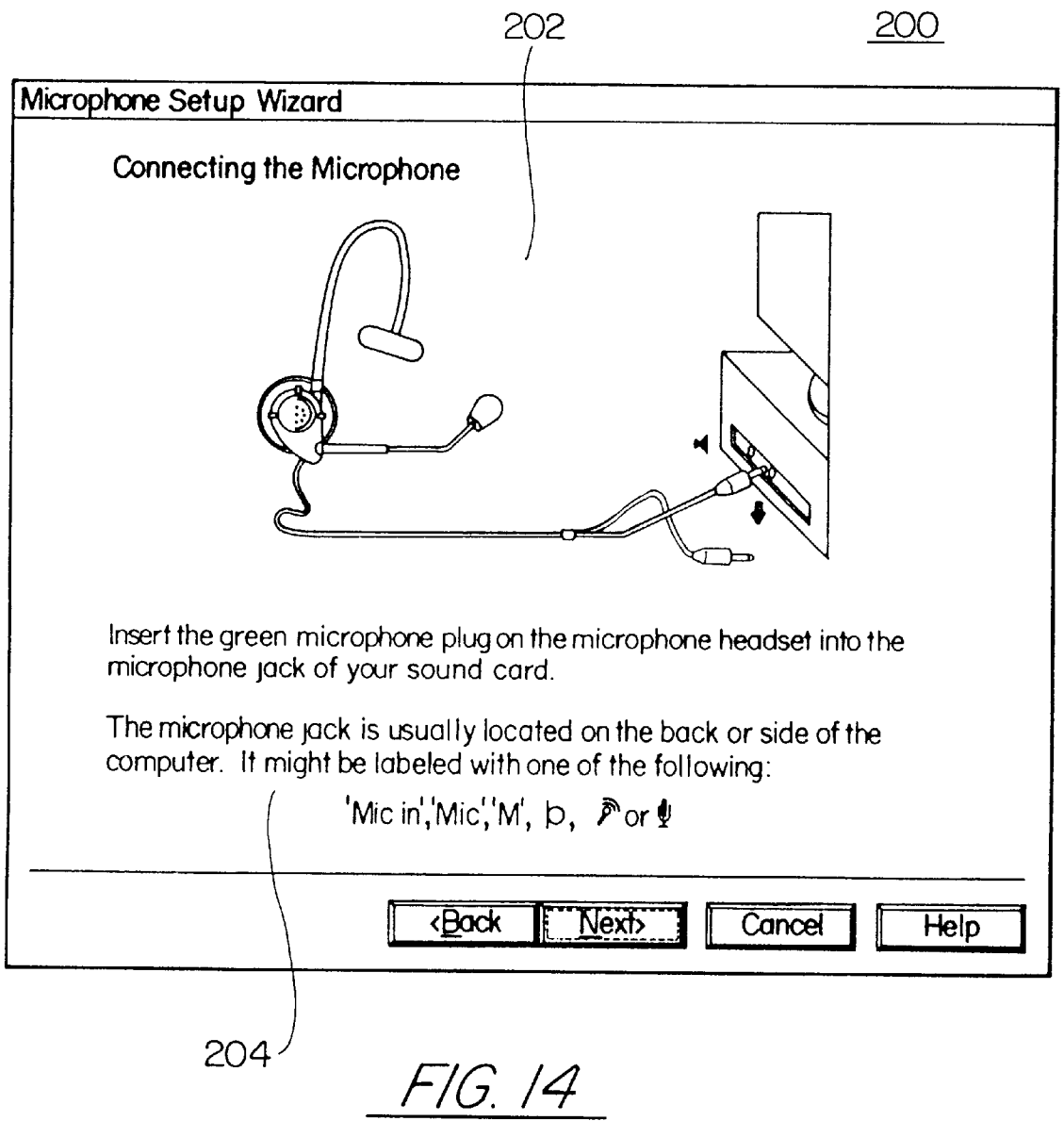
FIG. 14 is an exemplary screen display for a graphical user interface useful for illustrating the connection in an internal speaker configuration.
Figure 15:
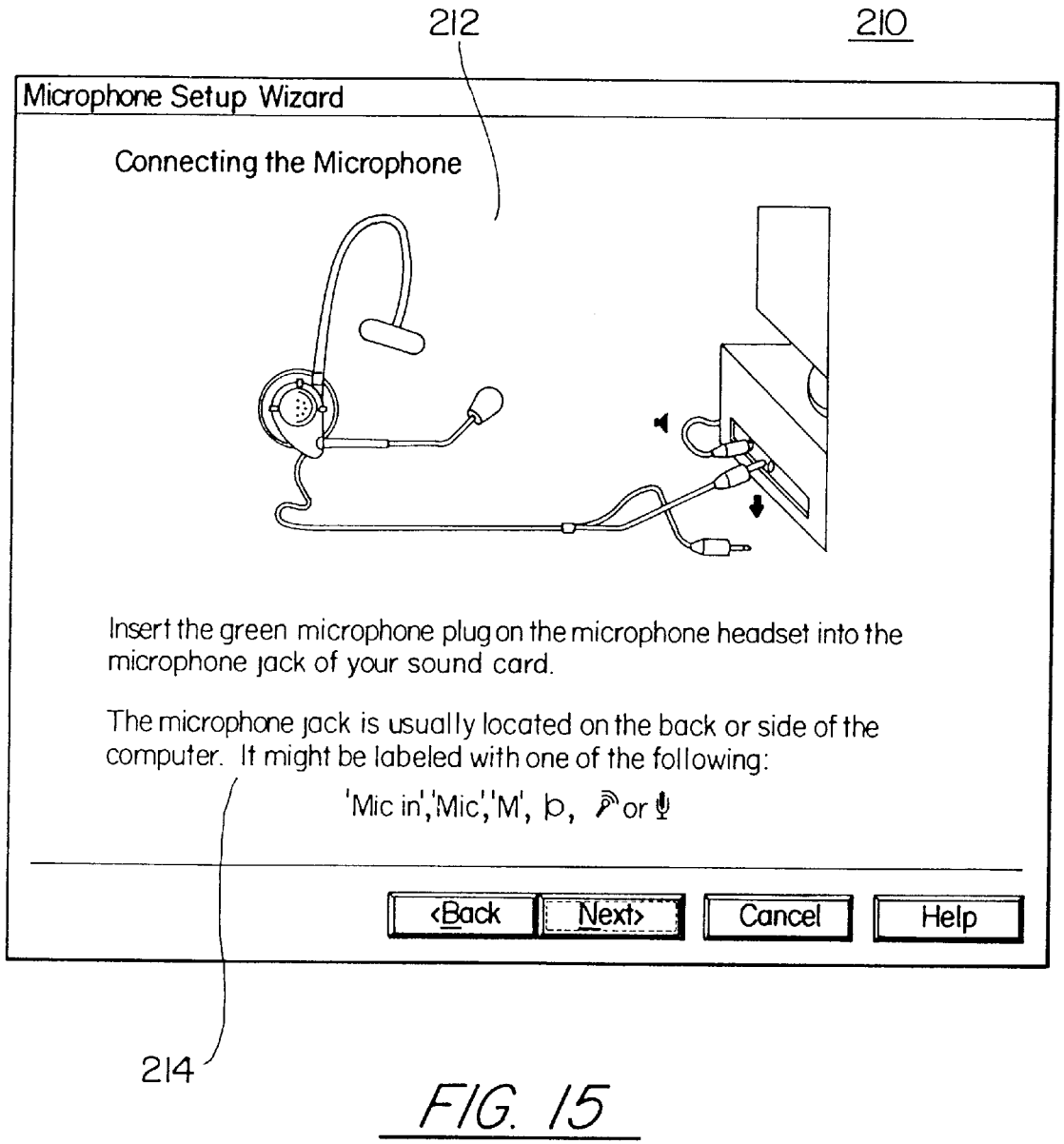
FIG. 15 is an exemplary screen display for a graphical user interface useful for illustrating the connection in an external speaker configuration.

The next GUI display will also depend upon prior user selections. If the user has identified and tested the headset as the audio output device, GUI display 190 shown in FIG. 13 is generated to illustrate connection of the headset microphone. Both headset plugs are shown for connection. A detailed picture 192, in color, and clear instructions 194 simplify the task. If the user has identified and tested the internal speaker as the audio output device, GUI display 200 shown in FIG. 14 is generated to illustrate connection of the headset microphone. Only the headset microphone plug is shown for connection. No external speaker plug is shown. Detailed picture 202, in color, and clear instructions 204 simplify the task. If the user has identified and tested external speakers as the audio output device, GUI display 210 shown in FIG. 15 is generated to illustrate connection of the headset microphone. Connection of the headset microphone plug is shown, with an external speaker plug 216 already in place. Detailed picture 212, in color, and clear instructions 214 simplify the task.

Figure 16:
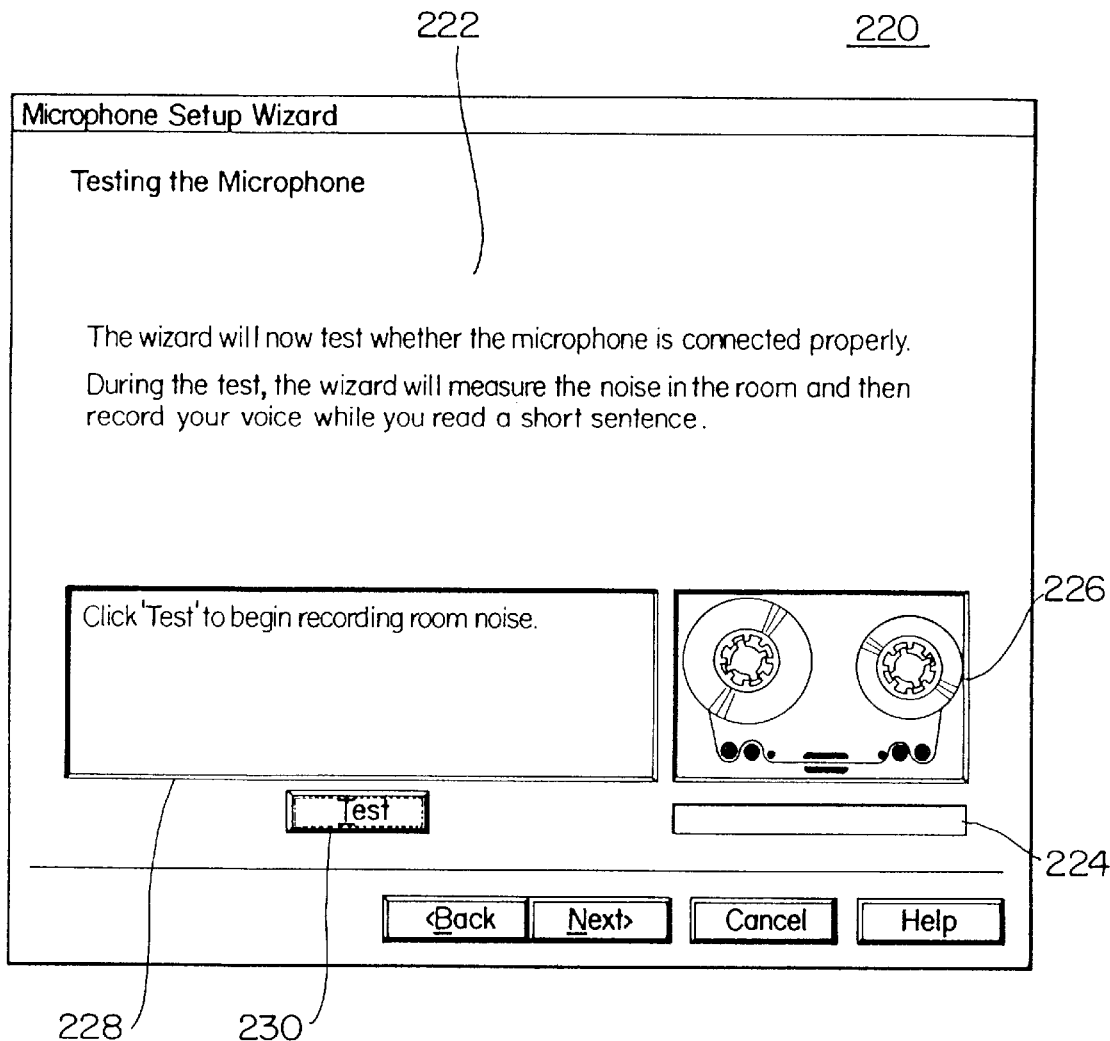
FIG. 16 is an exemplary screen display for a graphical user interface useful for initiating a user interactive microphone test.

A GUI display 220 shown in FIG. 16 is used to guide the user through the testing procedure. The microphone test has two parts and the GUI display 220 is modified as the test proceeds. The first part of the test is recording only background, room noise levels. This is explained in a message section 222. Visual feedback is provided via an animated icon of a volume meter 224 and an icon of a tape recorder 226, which can be shown as not operating or can be animated to illustrate recording in progress. At present, implementation of the volume meter is dependent on whether the particular sound card/driver supports the peak meter mixer interface of the Windows 95 platform. Windows 95 is a trademark of Microsoft corporation. An instruction section 228 provides user directions. Finally, a user activatable Test button 230 is displayed to initiate the test.

Figure 17:
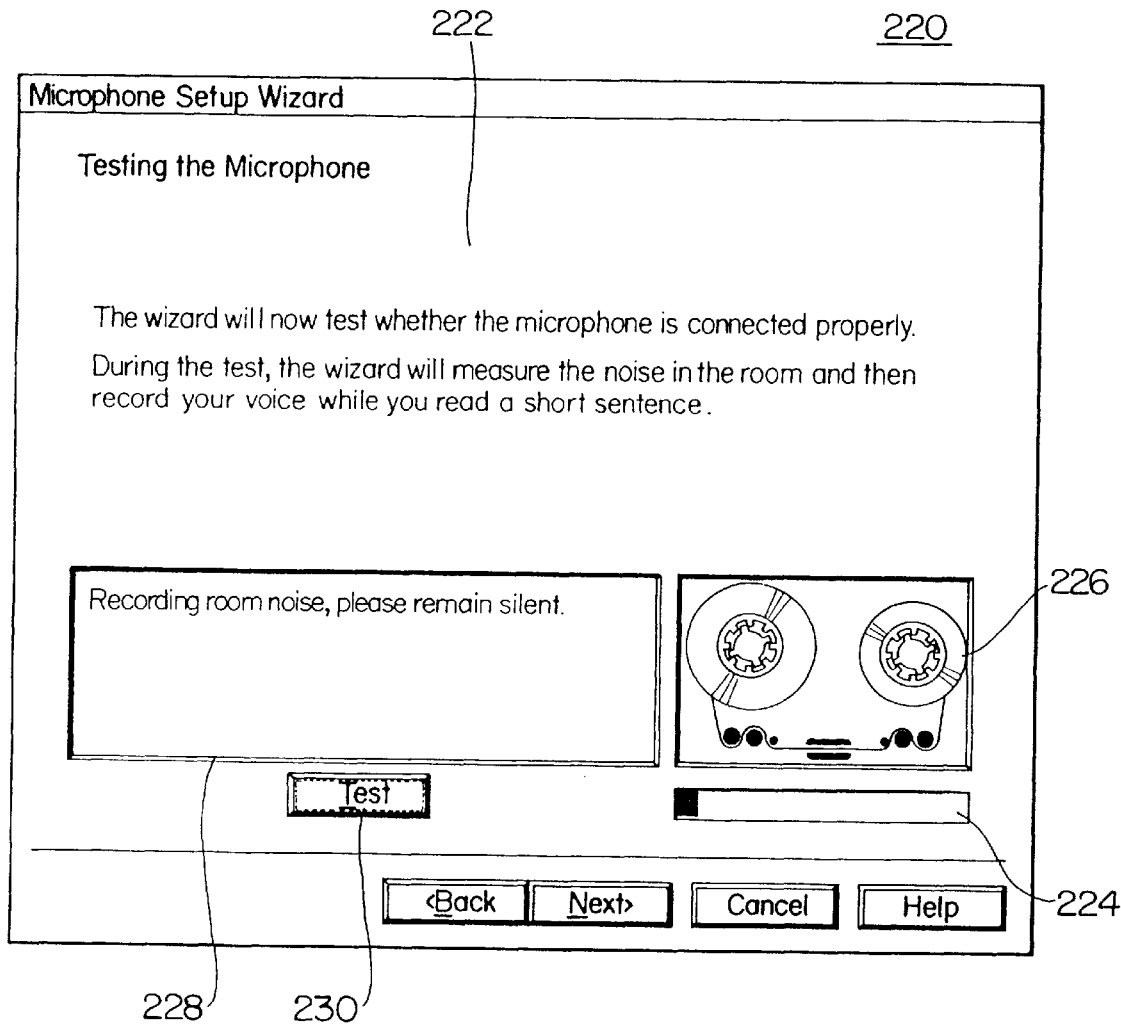
FIG. 17 is the exemplary screen display of FIG. 16 as a room noise sample is recorded.

When the Test button has been activated, the bottom portion of the GUI display is modified as shown in FIG. 17. The user is instructed to remain silent in section 228. The tape recorder undergoes an animation sequence illustrating the recording in progress. The volume meter moves as appropriate. After recording the room noise level, the recording is terminated and the corresponding animation of the tape recorder and the volume meter is terminated.

Figure 18:
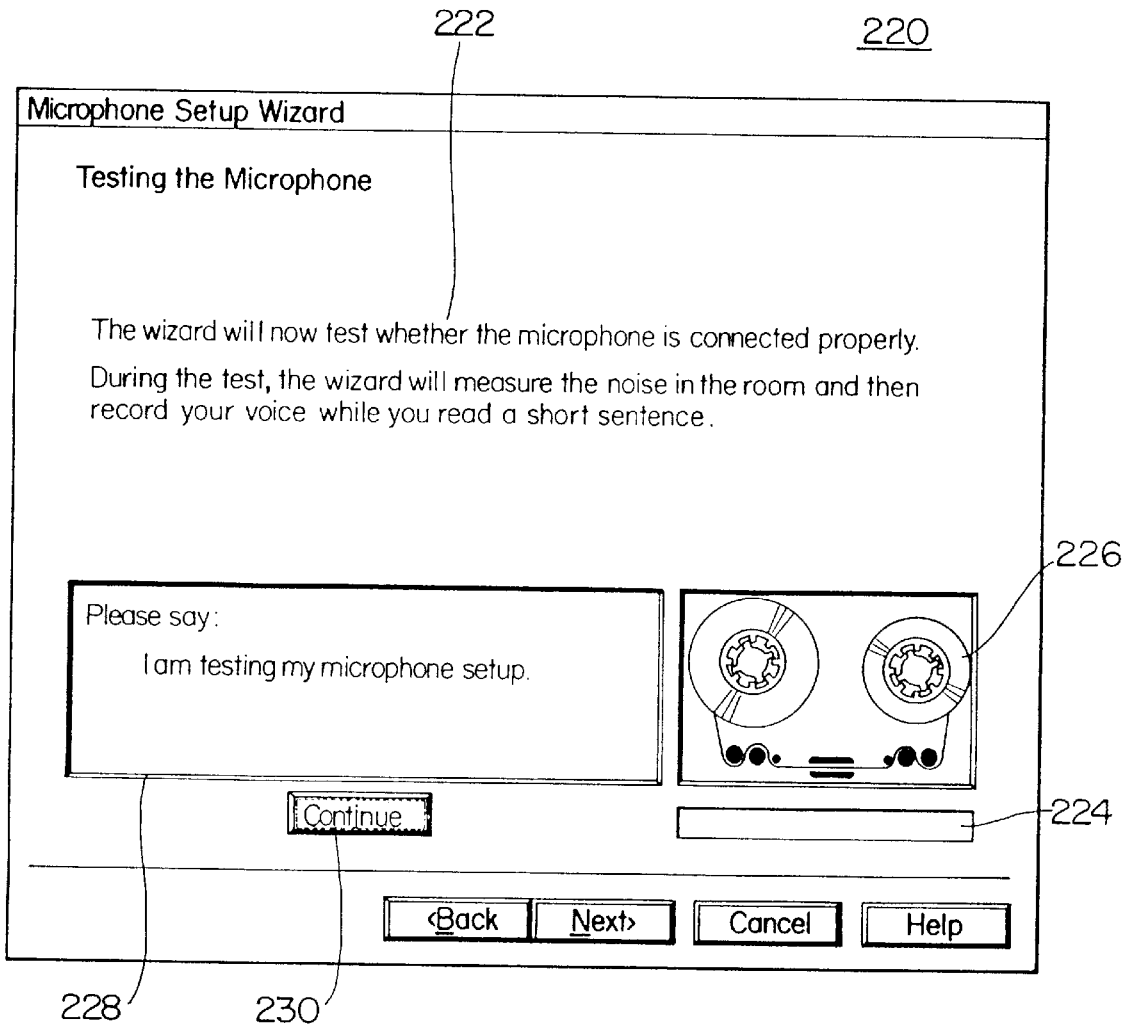
FIG. 18 is the exemplary screen display of FIG. 16 as a speech sample is recorded.

In the next step, the GUI display 220 is modified as shown in FIG. 18. The user is instructed to recite a phrase into the microphone, for example "I am testing my microphone setup." The text of the button 230 is changed to Continue. Recording the phrase is initiated by pressing the Continue button. The animation sequences of the tape recorder and the volume meter begin again as the phrase is recited into the microphone. After a predetermined amount of recording time, for example about five seconds, the recording is terminated, as are the corresponding animation sequences of the tape recorder and volume meter.

Figure 19:
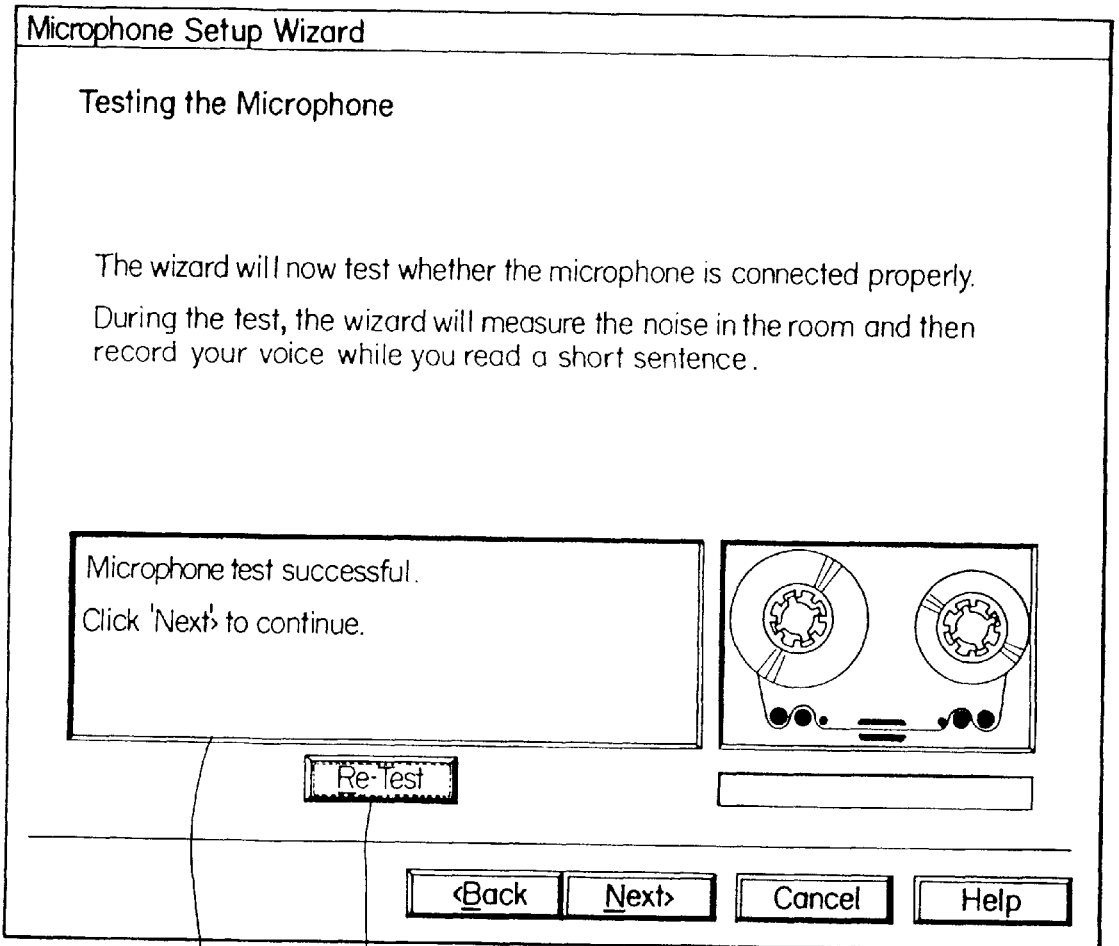
FIG. 19 is the exemplary screen display of FIG. 16 as indicating a successful microphone test.

The tool then compares the signal level and noise level and determines whether or not there was a valid microphone signal. If the test was successful, the text in section 228 is modified to advise the user that the microphone test was successful and that the configuration process can continue when the user activates the Next button, as shown in FIG. 19. In the event the user chooses to retest the connection, the text of the button 230 is change to Re-Test. Activation of the Re-Test button would return the user to GUI display 220 as shown in FIG. 16.

Figure 20:
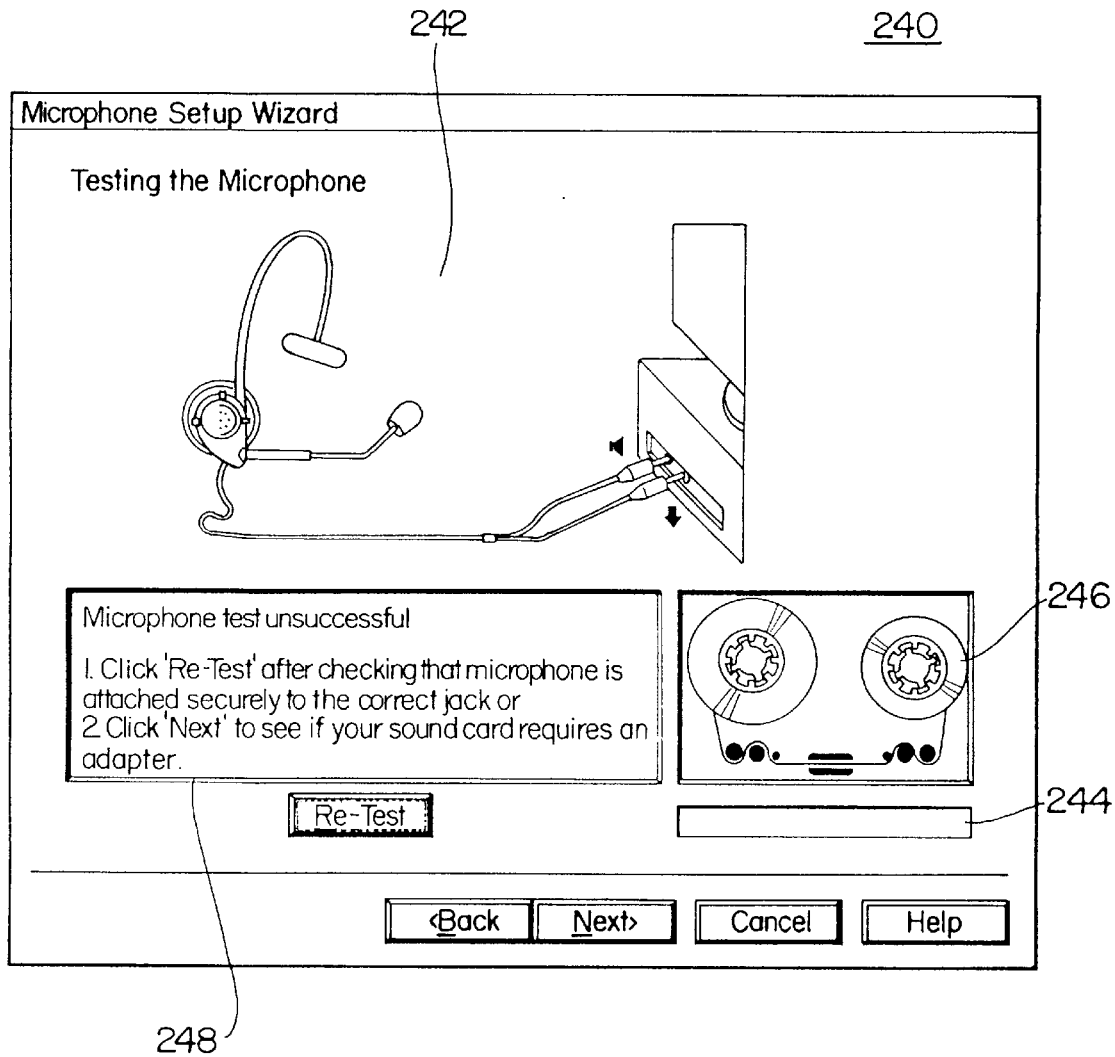
FIG. 20 is an exemplary screen display for a graphical user interface useful for providing instructions when the microphone test has failed.

If the microphone test is successful, the flow chart branches on path 60 to the step of block 46, which will be later explained in detail. If the microphone test is not successful, GUI display 240 as shown in FIG. 20. GUI display 240 includes a picture 242 of the headset and microphone plug as tested, to remind the user of the proper connection. This picture will differ, depending upon the user's prior selection of an output audio device. GUI display 240 also includes the tape recorder representation 246 and a volume bar representation 244 as shown GUI display 220 in FIG. 16. In the instruction section 248, the user is provided with two options. One option is check the microphone plug for secure attachment and to retest the microphone connection. The other option is to select the Next button to initiate a determination if the sound card requires an adapter.

If the retesting is successful, the process branches to the step of block 46 on path 60. If the retesting is unsuccessful, and no power adapter or battery adapter was identified in the information gathering step, the process branches on path 64 to block 58, corresponding to a failure of the microphone connection with no adapter alternatives available.

If the retesting is unsuccessful or the user chooses not to retest, and a power adapter is available, the process moves to the step of connecting a power adapter and retesting the connection. If the retesting is unsuccessful or the user chooses not to retest, and no power adapter is available, but a battery adapter is available, the process advantageously skips the step of block 40 and moves to the step of connecting a battery adapter and retesting the connection in block 42.

Figure 21:
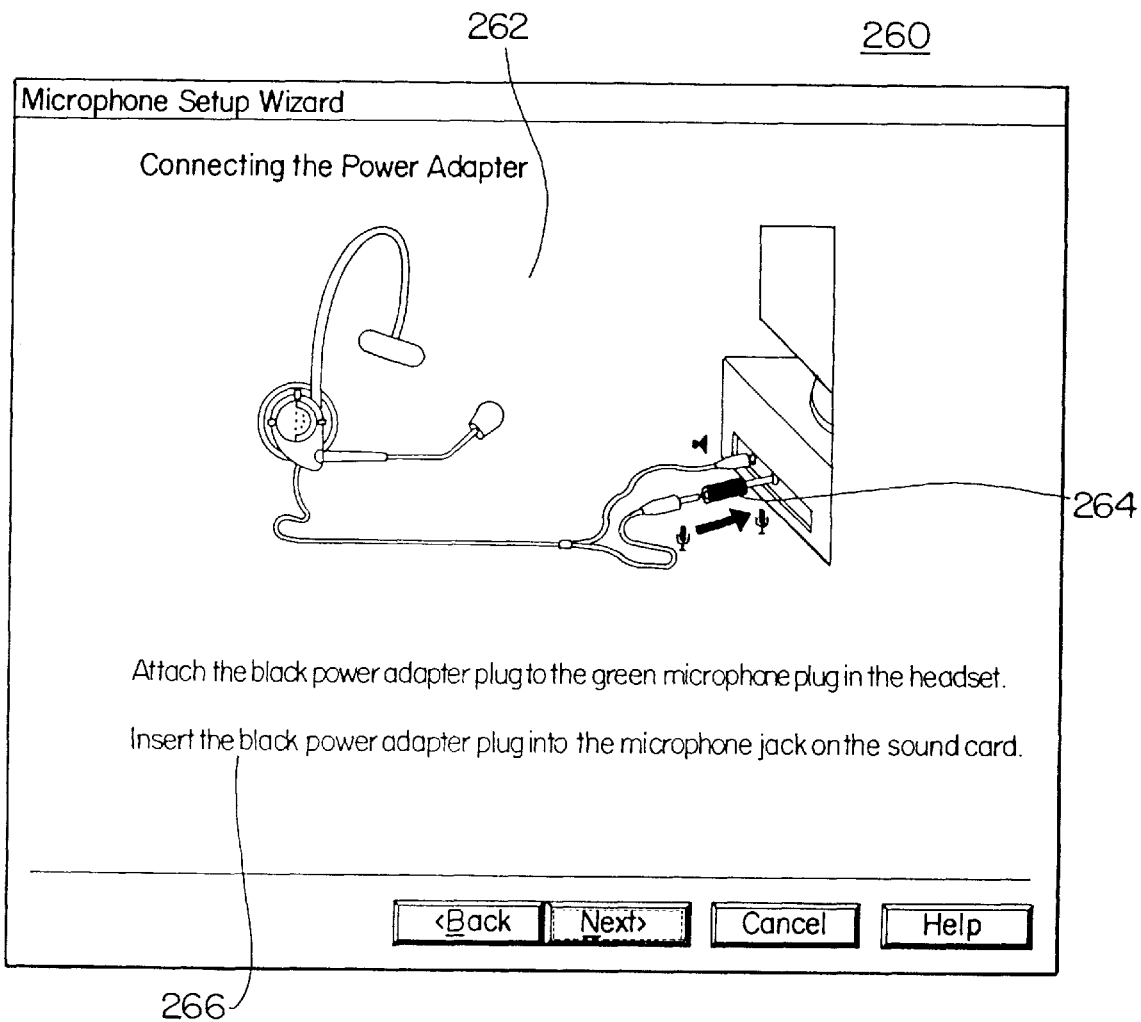
FIG. 21 is an exemplary screen display for a graphical user interface useful for explaining connection of a power adapter in a headset configuration.
Figure 22:
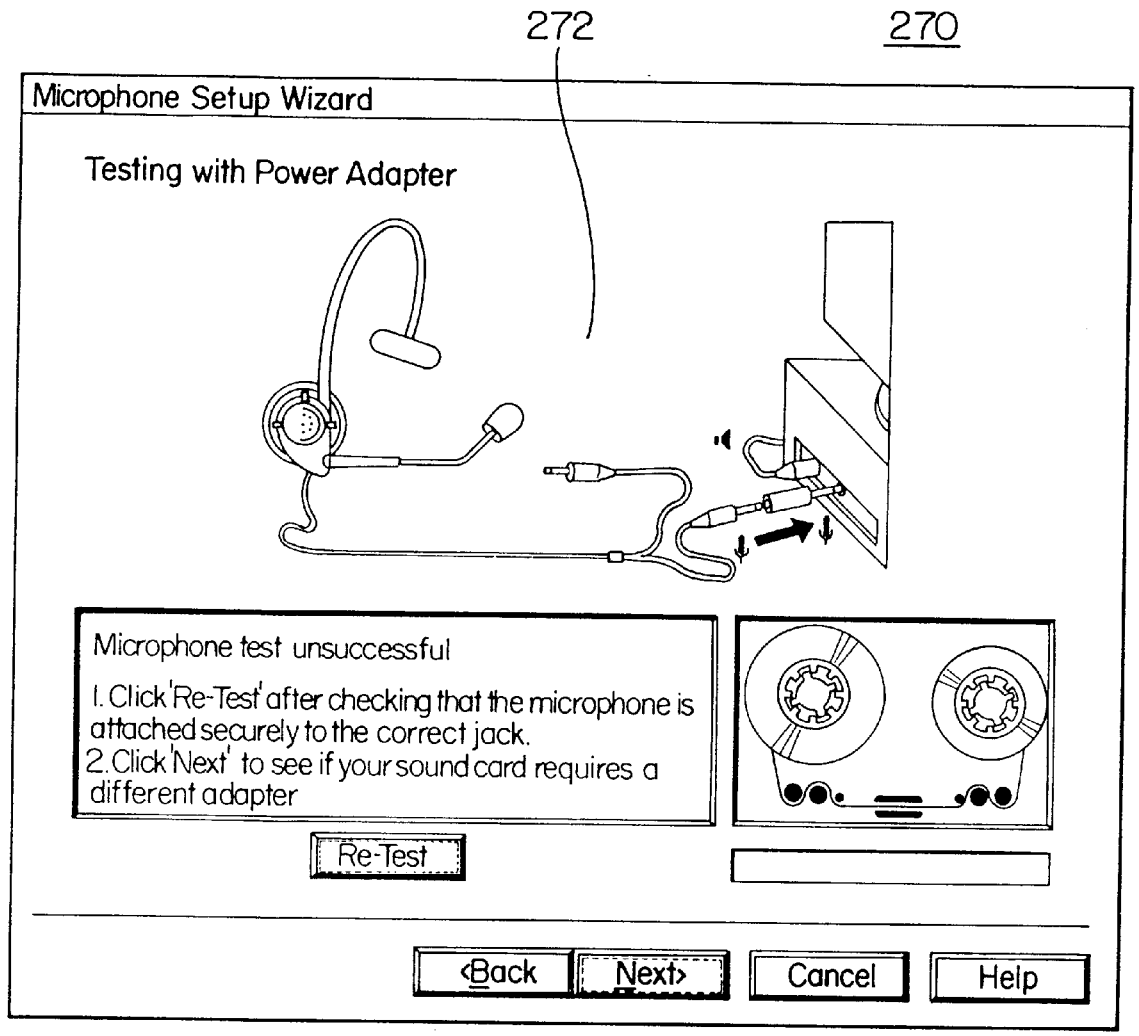
FIG. 22 is an exemplary screen display for a graphical user interface useful for initiating a user interactive microphone test with the power adapter in an external speaker configuration.

Assuming that testing the microphone alone was unsuccessful, and that a power adapter was identified, a GUI display 260 shown in FIG. 21 instructs the user on connecting the power adapter. A detailed picture 262 includes the power adapter 264. An instruction section 266 explains the connection. Activating the Next button returns the user to a GUI display identical to GUI display 220 shown in FIG. 16, except that the screen is titled Testing With Power Adapter. It will be appreciated that picture 262 will correspond to the audio output device selected by the user, as is the case with many of the alternative screen displays explained above. It is unnecessary to illustrate these alternative screens. The retesting proceeds as explained in connection with block 40. If the retesting with the power adapter is successful, the process branches on path 62 to block 46. If the retesting is unsuccessful, GUI display 270 as shown in FIG. 22 is generated. GUI display 270 has a picture 272 showing the arrangement being tested, namely with a power adapter. The picture 272 will differ in accordance with the selected audio output device. The steps associated with GUI display 270 are the same as those explained in connection with GUI display 240. If the retesting is unsuccessful and no battery adapter is available, the process branches on path 66 to block 58. If the retesting is unsuccessful and a battery adapter is available, the process moves to the connecting and testing with a battery adapter step of block 42.

Figure 23:
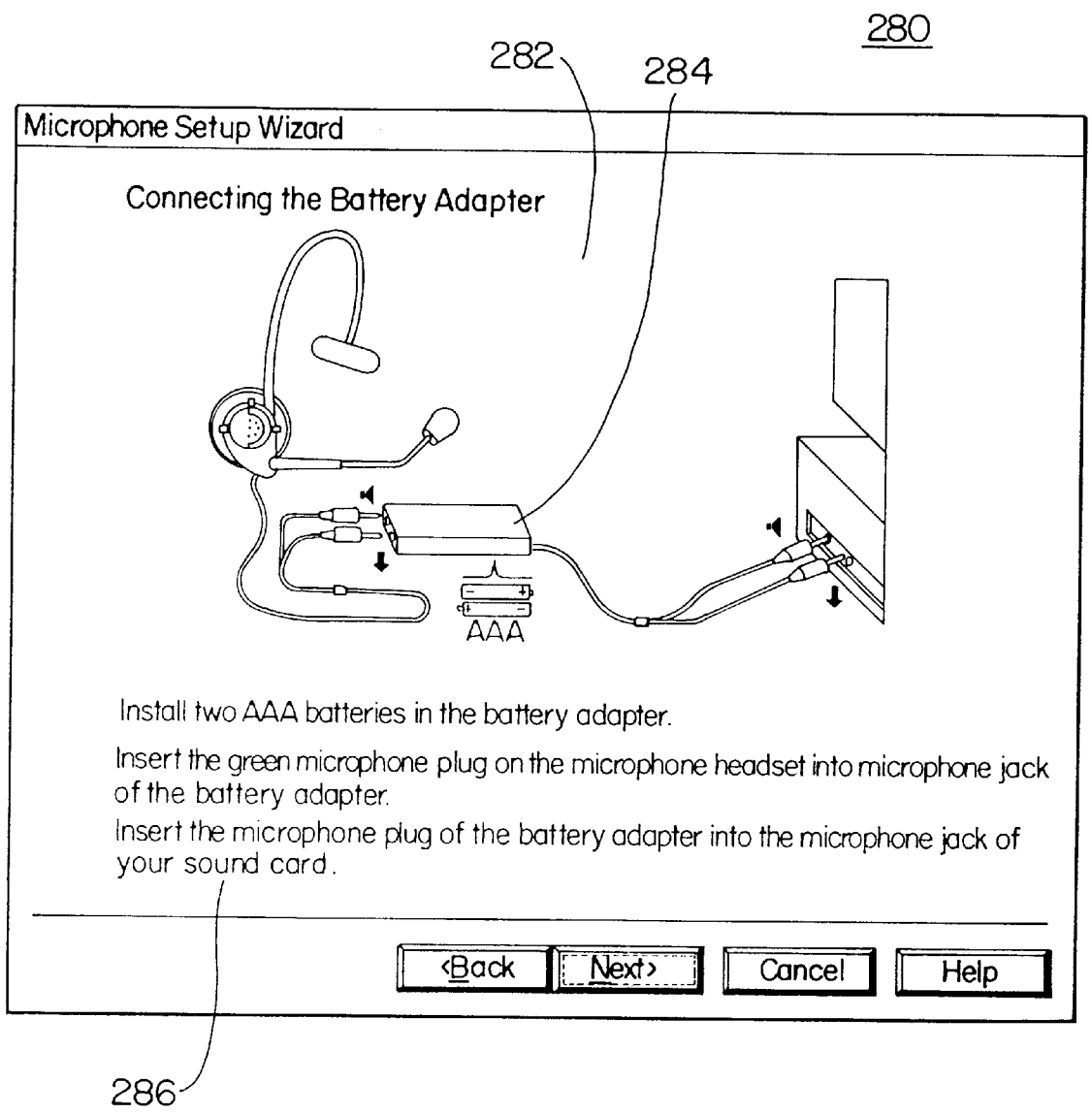
FIG. 23 is an exemplary screen display for a graphical user interface useful for explaining connection of a battery adapter in a headset configuration.

In block 42, a GUI display 280 shown in FIG. 23 instructs the user on connecting the battery adapter. A detailed picture 282 includes the battery adapter 284. An instruction section 286 explains the connection. Even the polarity of the batteries is illustrated. Activating the Next button returns the user to a GUI display identical to GUI display 220 shown in FIG. 16, except that the screen title changes to Testing With Battery Adapter. It will be appreciated that picture 262 will correspond to the audio output device selected by the user, as is the case with many of the alternative screen displays explained above. It is unnecessary to illustrate these alternative screens. The retesting proceeds as explained in connection with block 40. If the retesting is unsuccessful, the process branches on path 68 to block 58. If the retesting with the battery adapter is successful, the process moves to the step of battery tips block 44.

Figure 24:
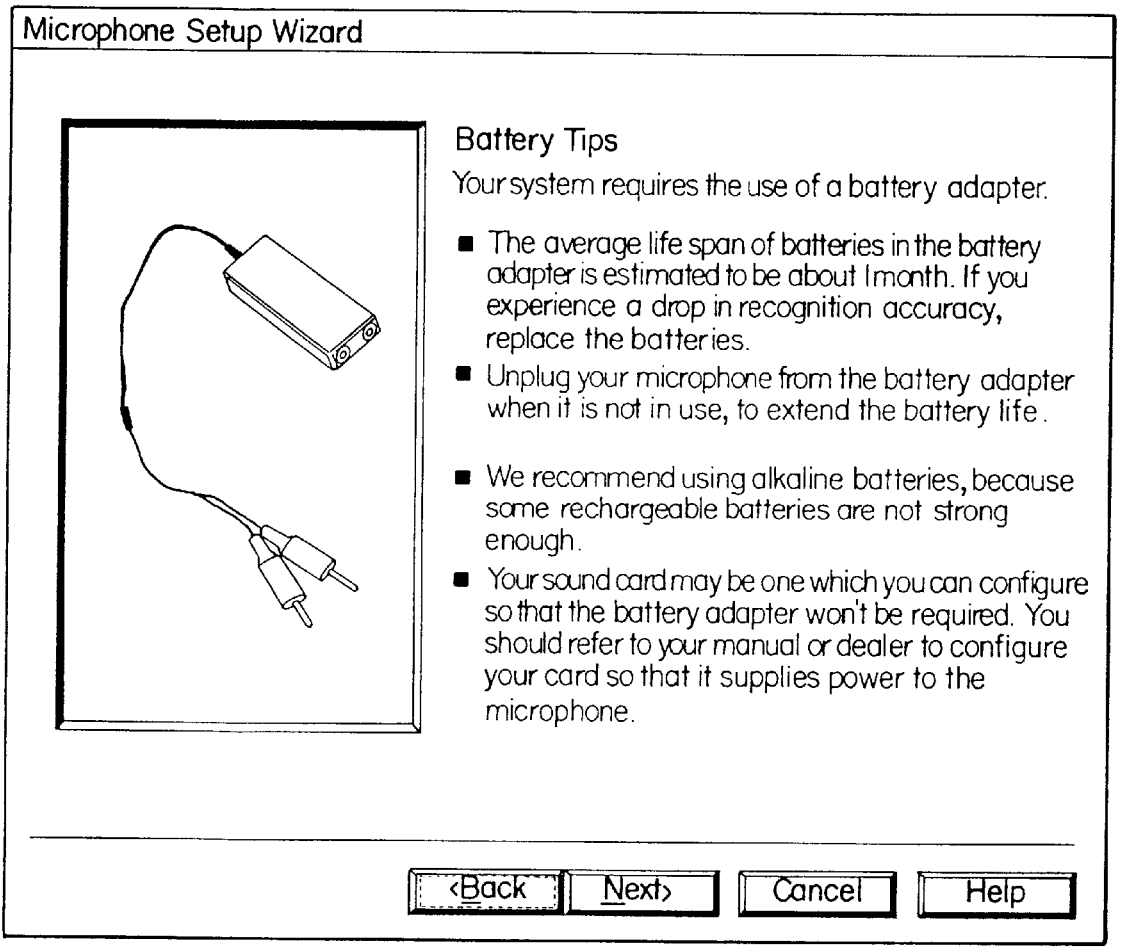
FIG. 24 is an exemplary screen display for a graphical user interface useful for providing battery tips.
Figure 25:
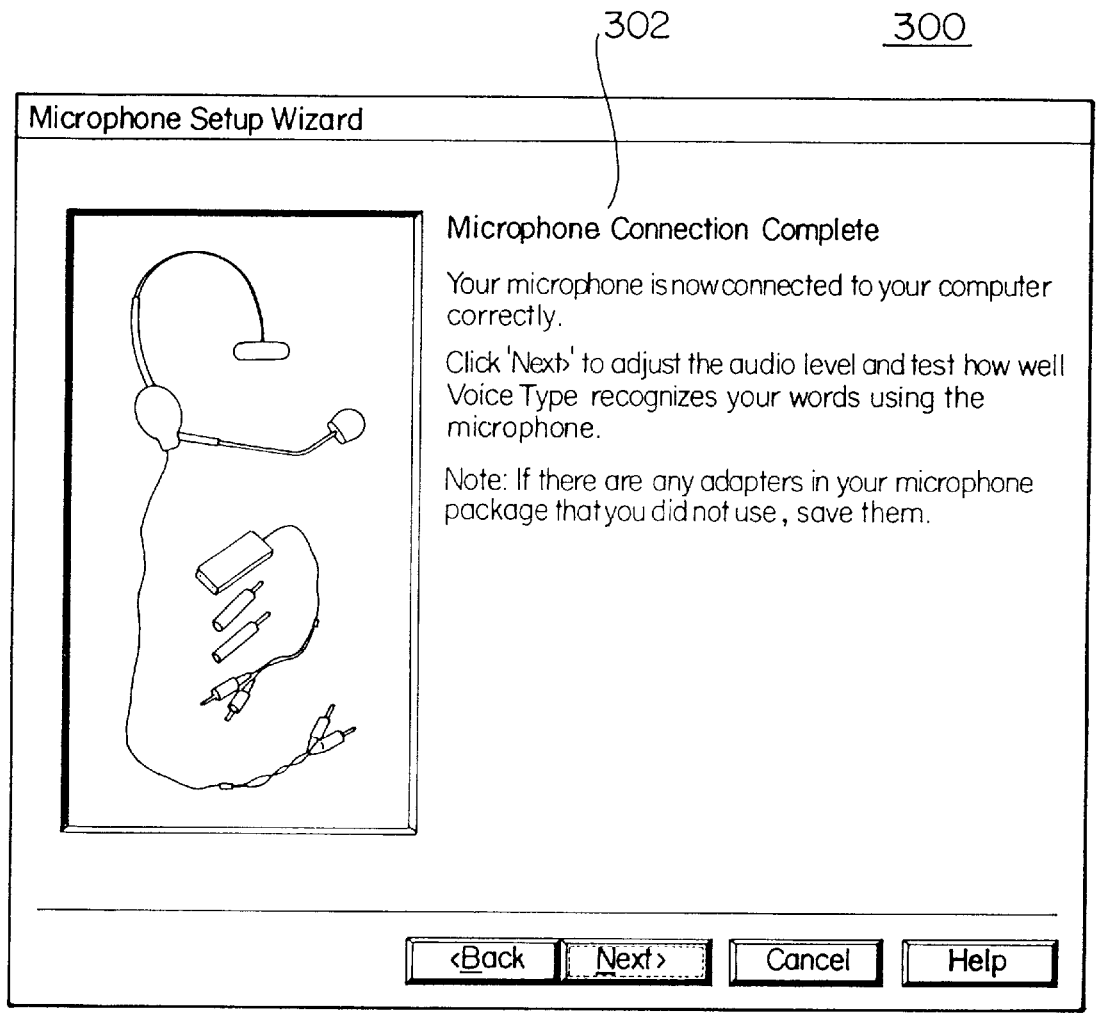
FIG. 25 is an exemplary screen display for a graphical user interface useful for indicating completion of microphone connection.

A GUI display 290 shown in FIG. 24 is displayed only if a battery adapter was identified and the test with a battery adapter was successful. GUI display 290 instructs the user in proper use of the battery adapter, including expected battery life and preferred battery types. When the user clicks Next, the process moves to microphone connection complete step of block 46, which can also be a step directly following blocks 38, 40 and 56. A GUI display 300 shown in FIG. 25 advises the user that the microphone connection is complete. GUI display 300 is the final page of the microphone connection and testing, and can be used to display any additional or closing information 302 to the user that might be of value. At this point the user should be able to hear audio playback, know how to position the microphone and have the correct microphone setup that allows the user to record audio using the VoiceType supplied microphone. Certain registry entries concerning the microphone setup are updated, in the event the user chooses to exit from the program. The user is instructed to activate the Next button to move to the adjusting audio level step of block 48.

Figure 26:
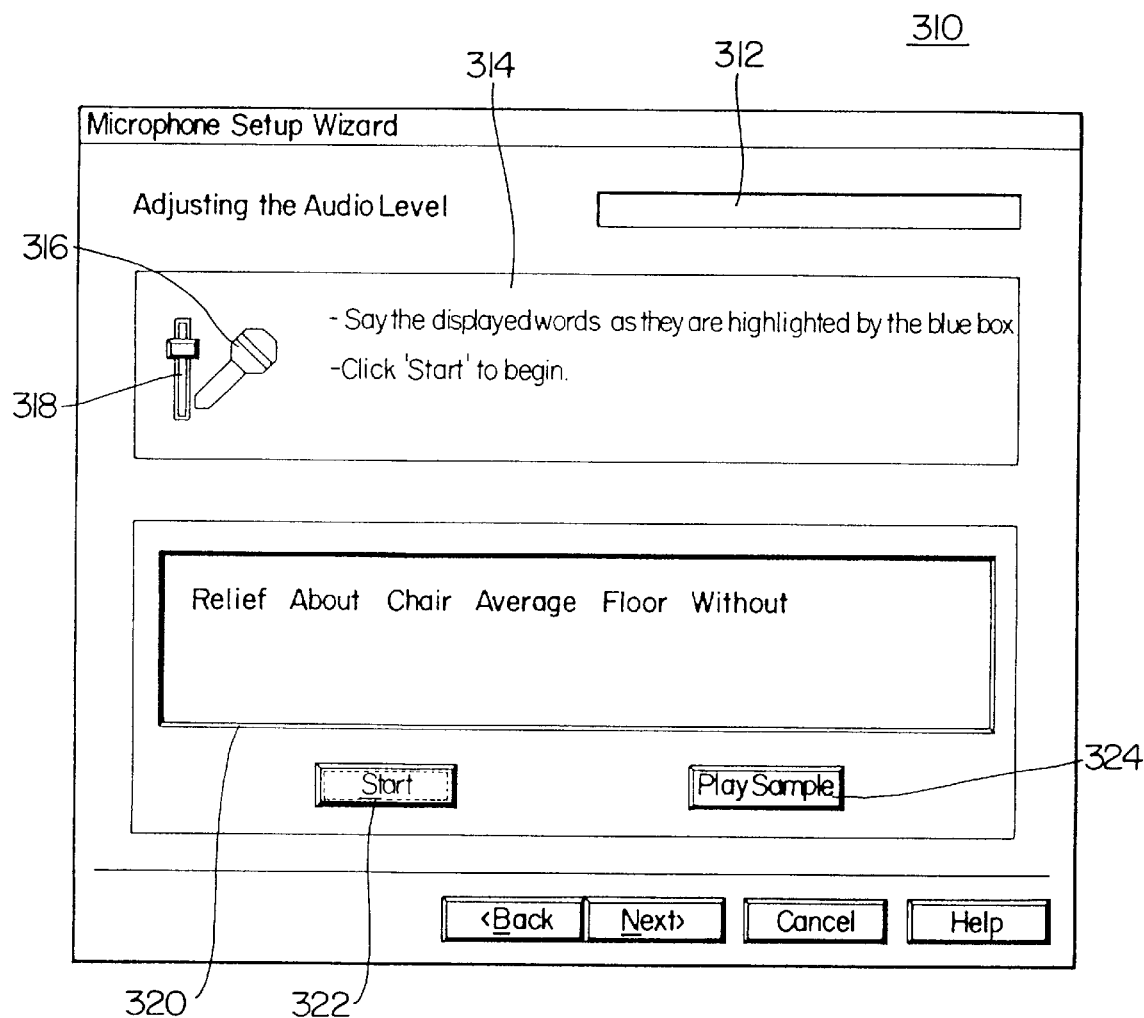
FIG. 26 is an exemplary screen display for a graphical user interface useful for initiating a user interactive audio level test.
Figure 27:
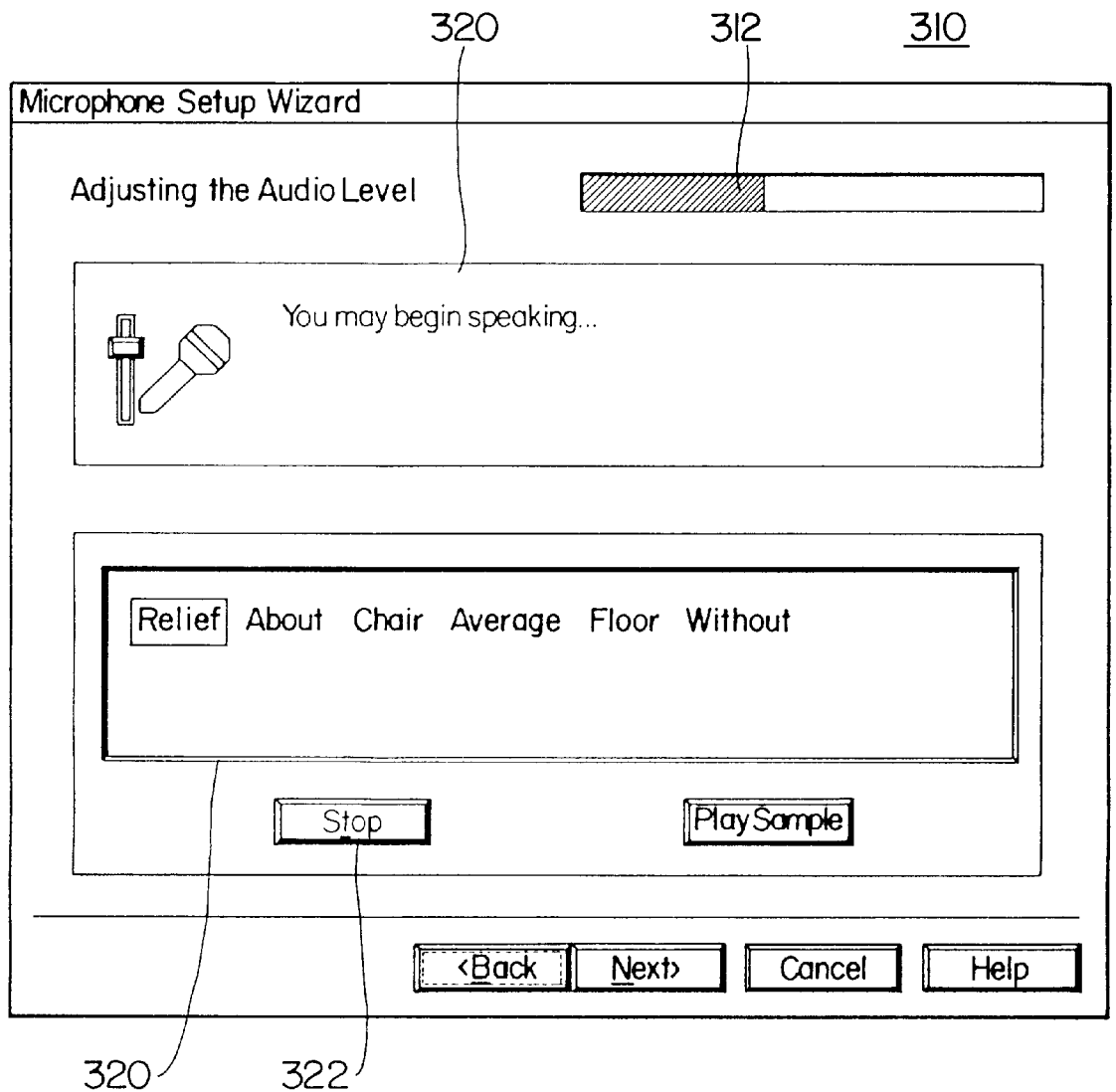
FIG. 27 is the exemplary screen display shown in FIG. 26 during audio recording.
Figure 28:
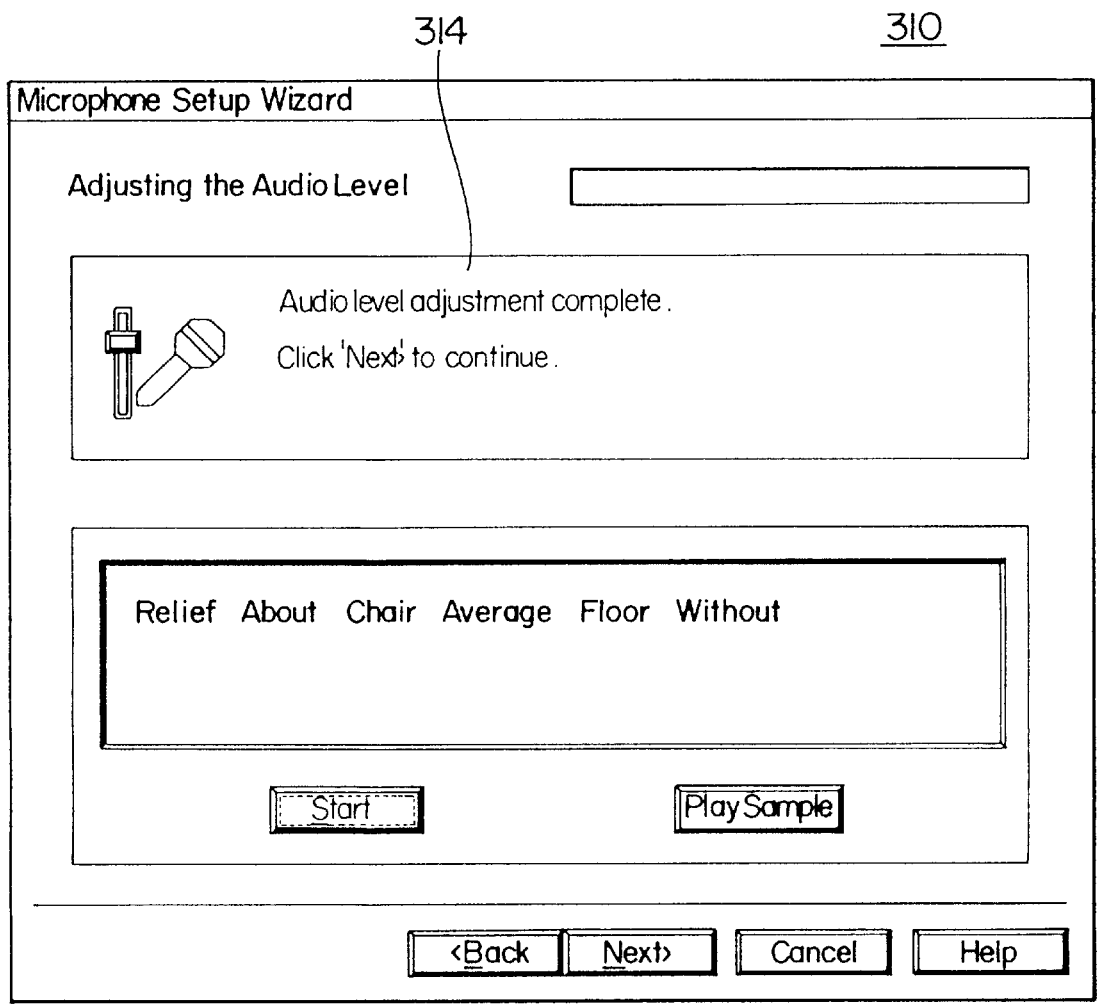
FIG. 28 is the exemplary screen display shown in FIG. 26 as indicating completion of audio level adjustment.

Adjusting the audio recording level is guided by GUI display 310 shown in FIG. 26. GUI display 310 includes an animated volume bar 312, an instruction section 314, a sample word section 320, a Start button 322 and a Play Sample button 324. Instruction section 314 includes icons of a microphone 316 and a volume control 318. The user is instructed to click the Start button. In response to the start button, GUI display 310 is modified as shown in FIG. 27. The user is instructed to say the six words listed in section 320 as they are highlighted by a colored pacer box, for example blue, or box outline as shown. The volume bar 312 is animated during the dictation to provide feedback to the user. The volume bar 312 is preferably one color to discourage users from adjusting their voices if they notice that their voices are out of range. The user can see a demonstration of this process by clicking the Play Sample button. If the test is successful, GUI display 310 is modified as shown in FIG. 28. The user is advised that the audio adjustment is complete and is instructed to click the Next button to continue the process.

Figure 29:
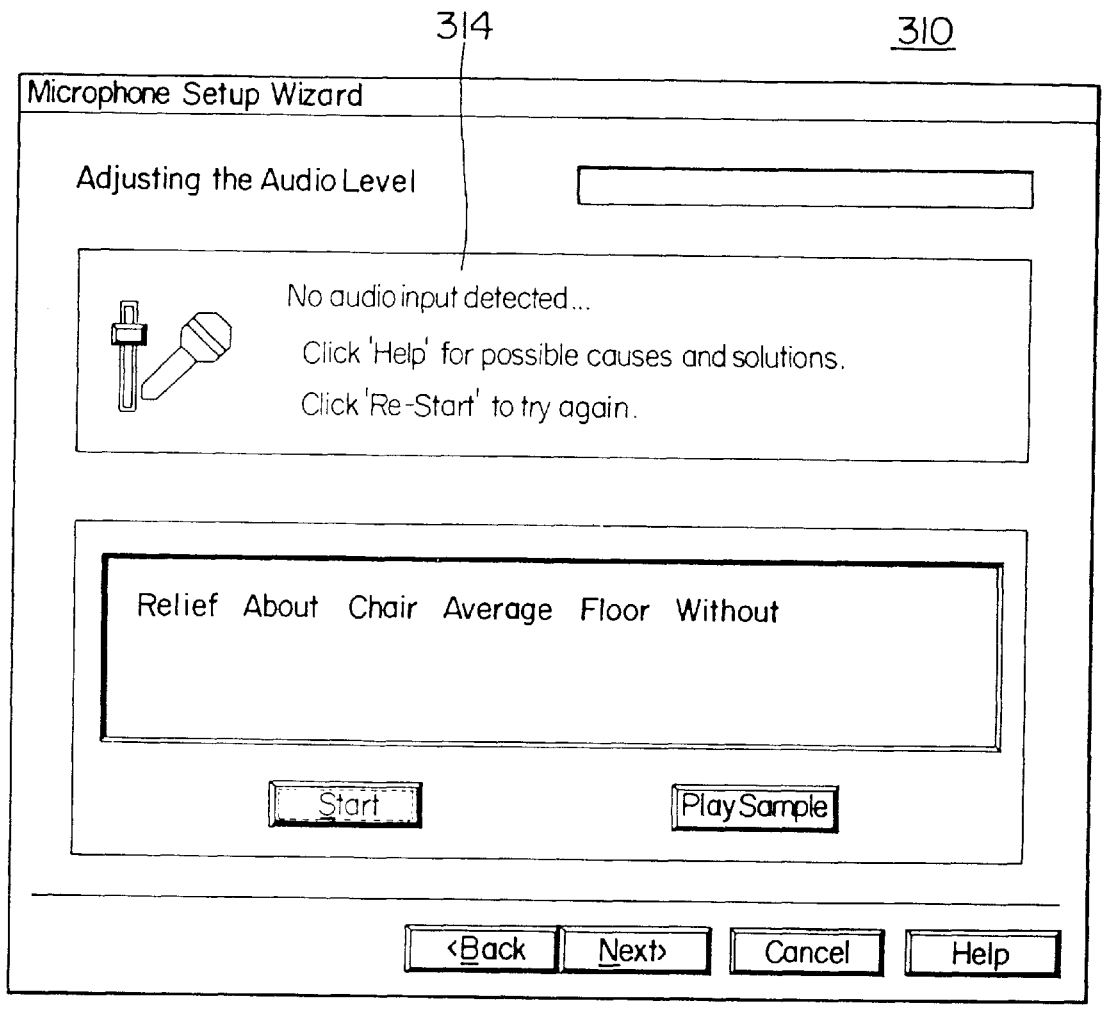
FIG. 29 is the exemplary screen display shown in FIG. 26 as indicating no detection of audio input.

If no audio is detected after 5 seconds, GUI display 310 will be modified as shown in FIG. 29. The instruction section 314 instructs the user to seek Help or to restart the test. If audio is detected, but the tool is unable to properly adjust the audio, the user will be prompted to add or remove the signal adapter if the tool cannot adjust the volume to an acceptable level by adjusting the mixer volume level. The user will be instructed to add the signal adapter if the following conditions are true: the user selected a signal adapter on the gathering information step; and, the tool has lowered the mixer volume slider to the bottom 5% of the maximum range. The user will be instructed to remove the signal adapter if the following conditions are true: the registry in the application indicates that the user is currently using the signal adapter; and, the tool has raised the mixer volume slider to 100% of the maximum range.

Figure 30:
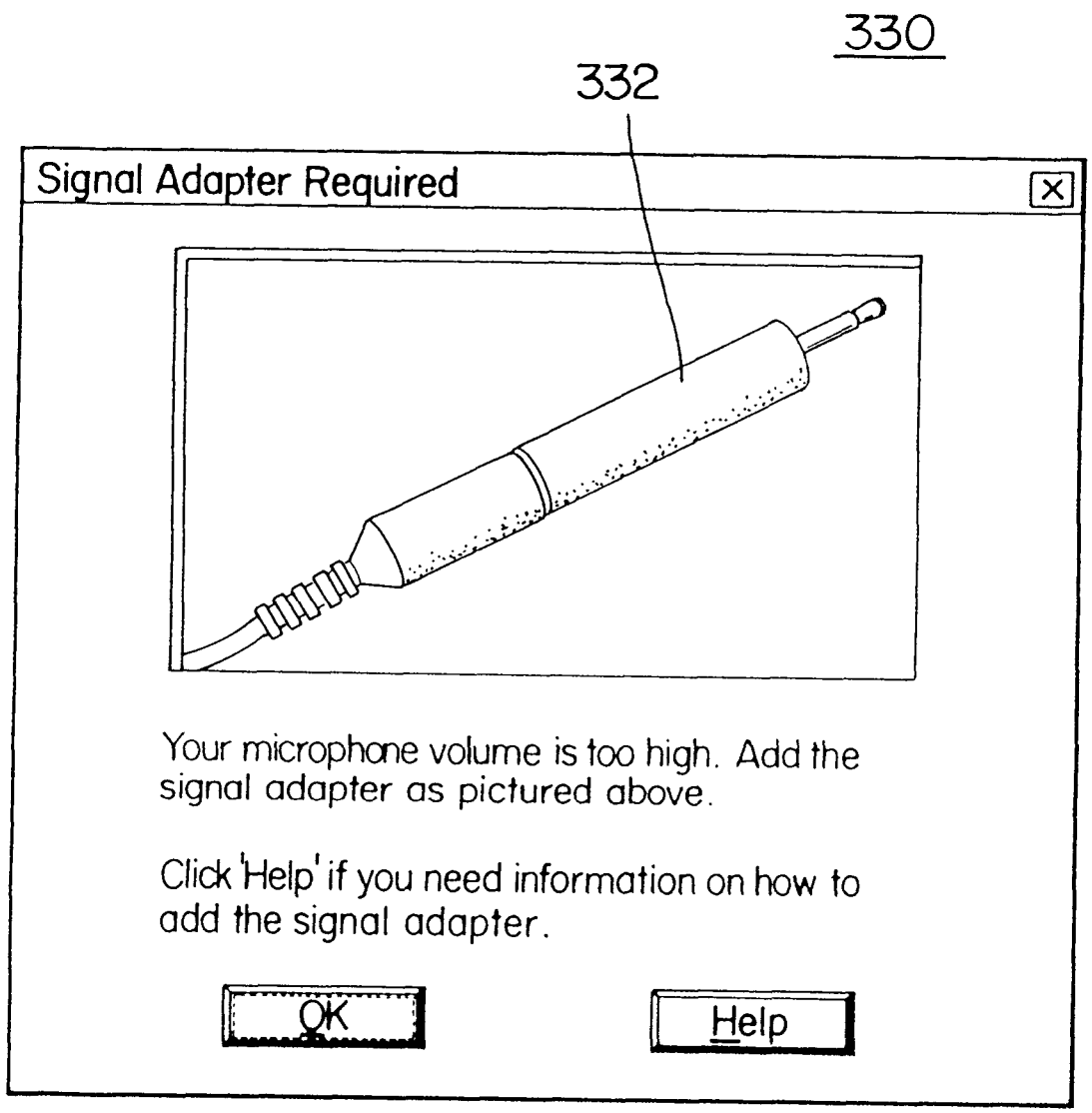
FIG. 30 is an exemplary screen display for a graphical user interface useful for instructing a user to add the signal adapter, when no power adapter is present.
Figure 31:
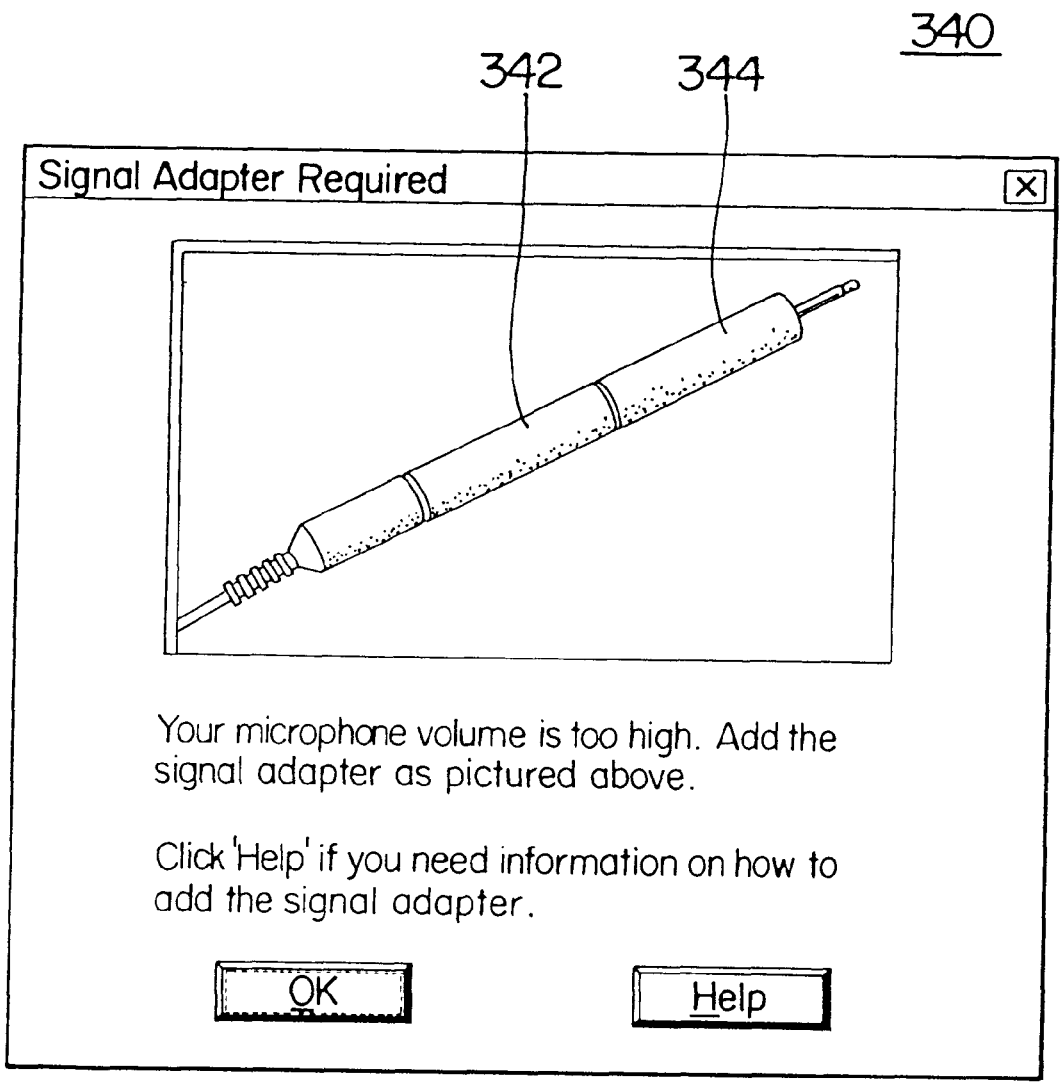
FIG. 31 is an exemplary screen display for a graphical user interface useful for instructing a user to add the signal adapter, when the power adapter is already present.

GUI display 330 shown in FIG. 30 will be displayed if no power adapter is being used. GUI display 330 provides pictorial and text instructions for adding a signal adapter 332 when no power adapter is present. Alternatively, the picture can be animated. GUI display 340 shown in FIG. 31 will be displayed if a power adapter is being used. GUI display 340 provides pictorial and text instructions for adding a signal adapter 342 when a power adapter 344 is present. Alternatively, the picture can be animated. Two displays are necessary for adding the signal adapter because the signal adapter must be added at a specific location if the power adapter is being used. In particular, the signal adapter must be connected between the microphone plug and the power adapter. A similar GUI display, not shown, can be provided for adding the signal adapter when the battery adapter is used.

Figure 32:
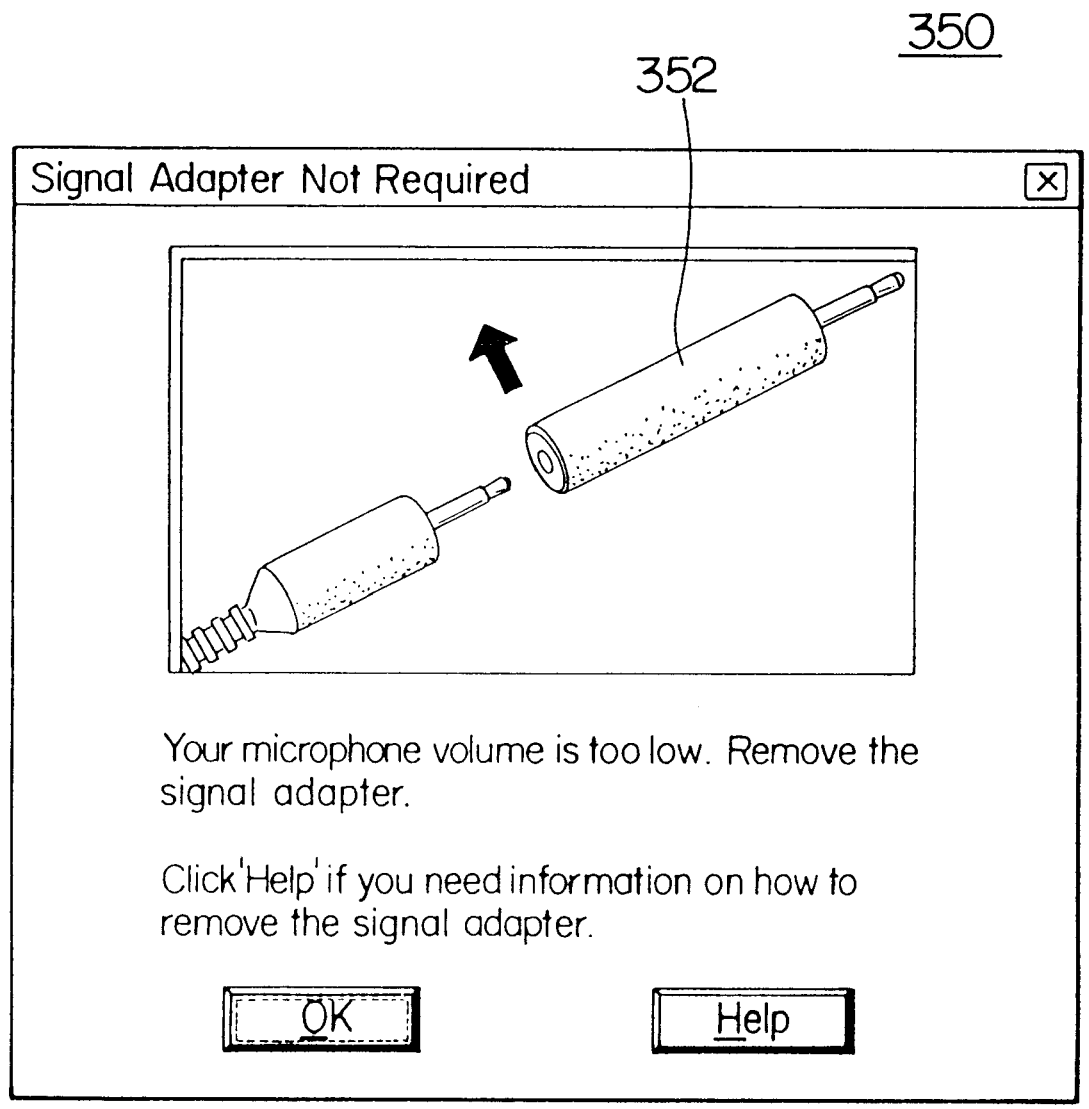
FIG. 32 is an exemplary screen display for a graphical user interface useful for instructing a user to remove the signal adapter, when no power adapter is present.
Figure 33:
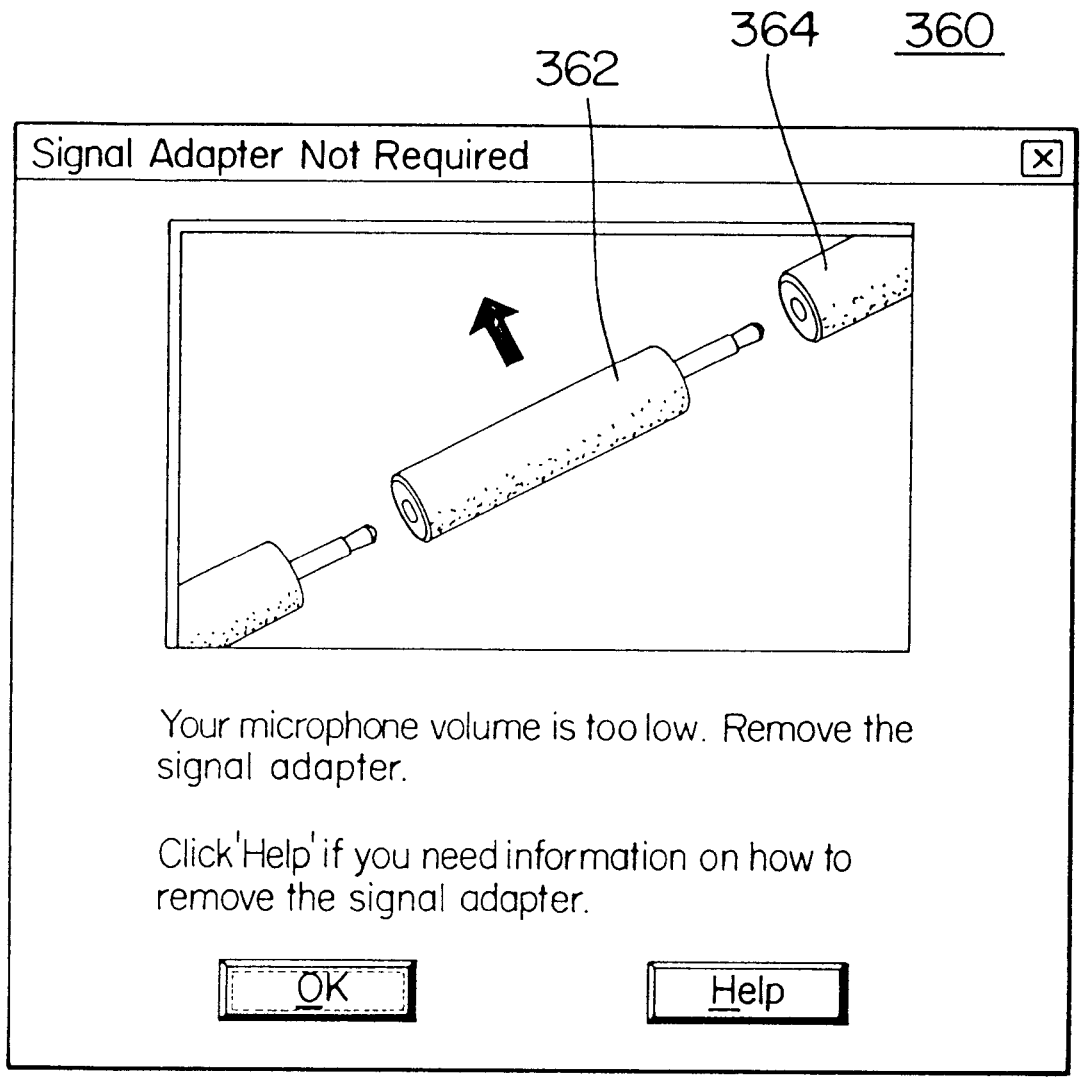
FIG. 33 is an exemplary screen display for a graphical user interface useful for instructing a user to remove the signal adapter, when the power adapter is present.

GUI display 350 shown in FIG. 32 will be displayed if no power adapter is being used. GUI display 350 provides pictorial and text instructions for removing a signal adapter 352 when no power adapter is present. Alternatively, the picture can be animated. GUI display 360 shown in FIG. 33 will be displayed if a power adapter 364 is being used. GUI display 360 provides pictorial and text instructions for removing a signal adapter 362 when no power adapter is present. Alternatively, the picture can be animated.

If the tool is unable to properly adjust the audio level, the process branches to a block, not shown, which results in generation of an advisory message that the adjusting audio level step is incomplete. The user is instructed on various options, including readjustment of the sound card parameters independently of the application and the tool.

Figure 34:
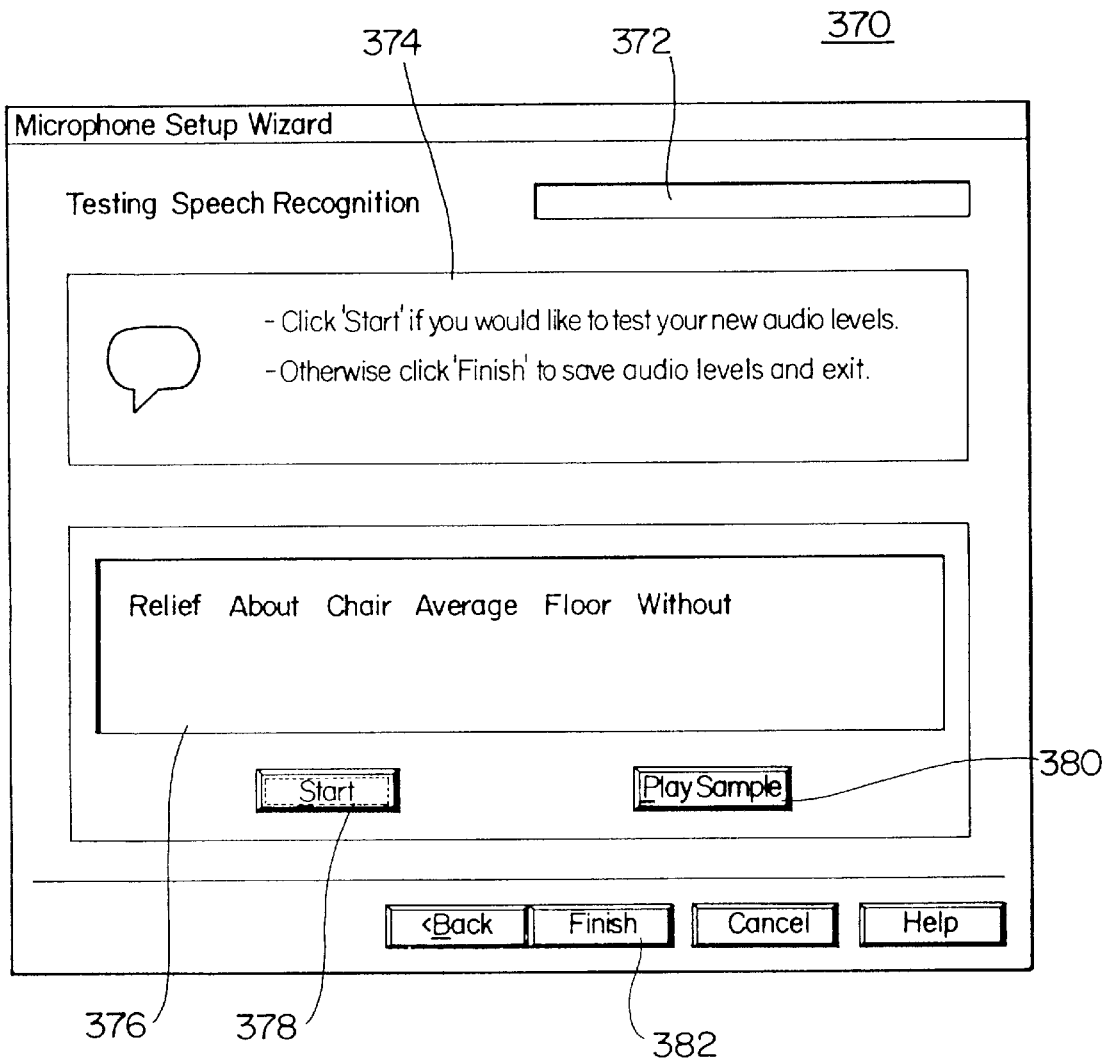
FIG. 34 is an exemplary screen display for a graphical user interface useful for initiating a user interactive speech recognition-test.

If the audio level adjustment test is successful and the user clicks the Next button, the process moves to the test speech recognition step of block 50. GUI display 370 shown in FIG. 34 is generated to test speech recognition, and includes a volume bar 372, an instruction section 374 and a sample word section 376. The Start button 378 and the Play Sample button 380 have the same purpose as explained in connection with GUI display 310 in FIG. 26. A new button 382 designated Finish replaces the Next button at the bottom of the display.

The user is provided with two options. One option is to save the adjusted audio levels and exit the application by clicking the finish button. Saving the adjusted audio levels is necessary because none of the adjusted settings is otherwise saved until the microphone setup has successfully concluded in an expected manner. The other option is to click the Start button to initiate testing speech recognition.

Figure 35:
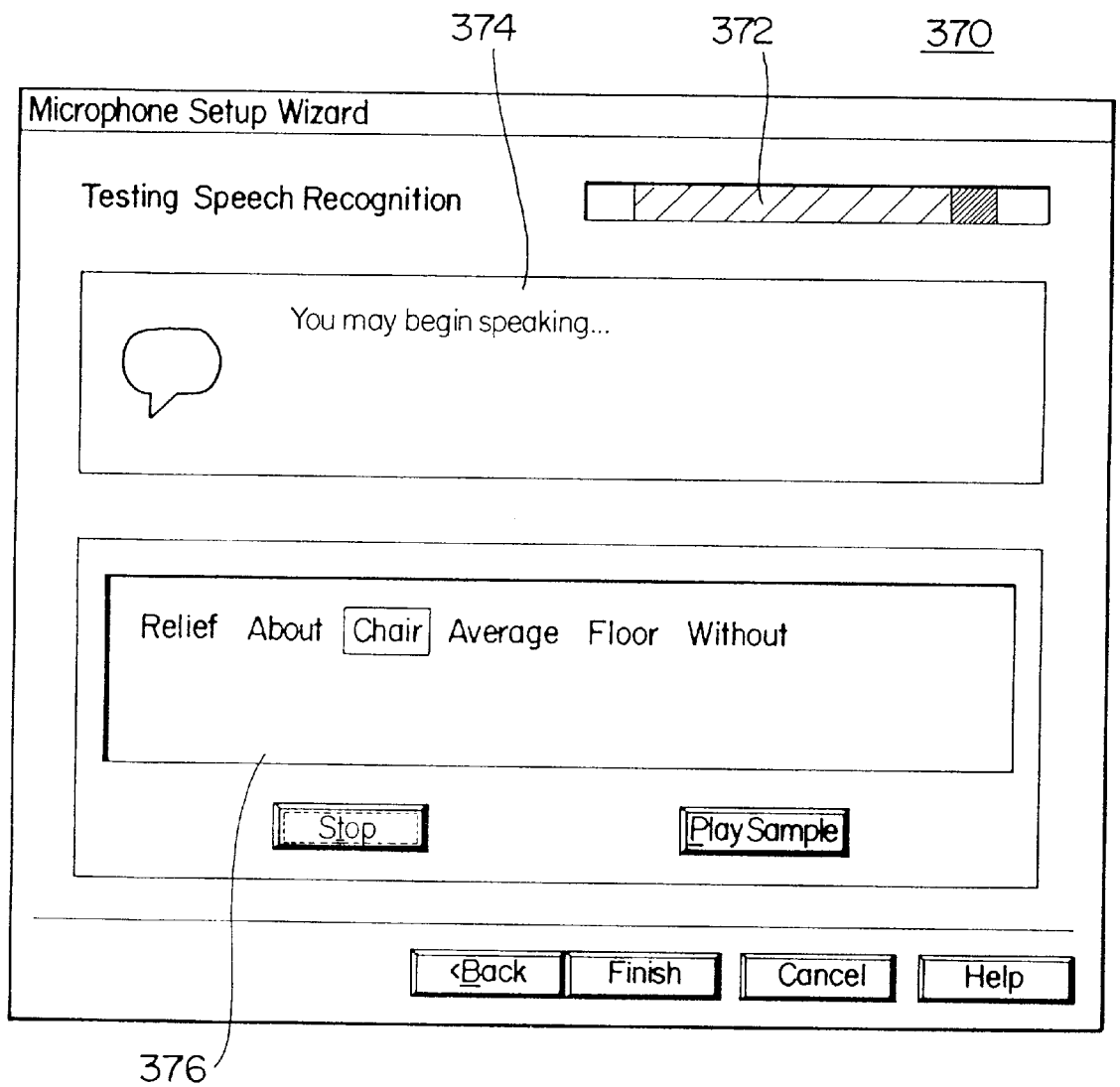
FIG. 35 is the exemplary screen display of FIG. 34 during speech recording.

The application must try to recognize the words that the user is speaking. If the application does not recognize a word then its color is changed, for example from black to red. The six words are selected because they are easily recognized by the application, and if the audio levels are reasonably close to optimal, the words should all be recognized. When the Start button has been clicked, the words are successively highlighted as shown in FIG. 35, and the user performs the same speaking task as when adjusting the audio level, as explained in connection with GUI display 310 shown FIGS. 26 and 27. The background of GUI display 370 can be made a different color than GUI display 310 to avoid confusion with the earlier test. The audio level meter is animated to change colors, for example, from solid blue to yellow/green/red to give the user feedback on how well the audio is adjusted. It is not necessary to discourage users from adjusting their voices because all equipment and audio adjustments have already been made.

Figure 36:
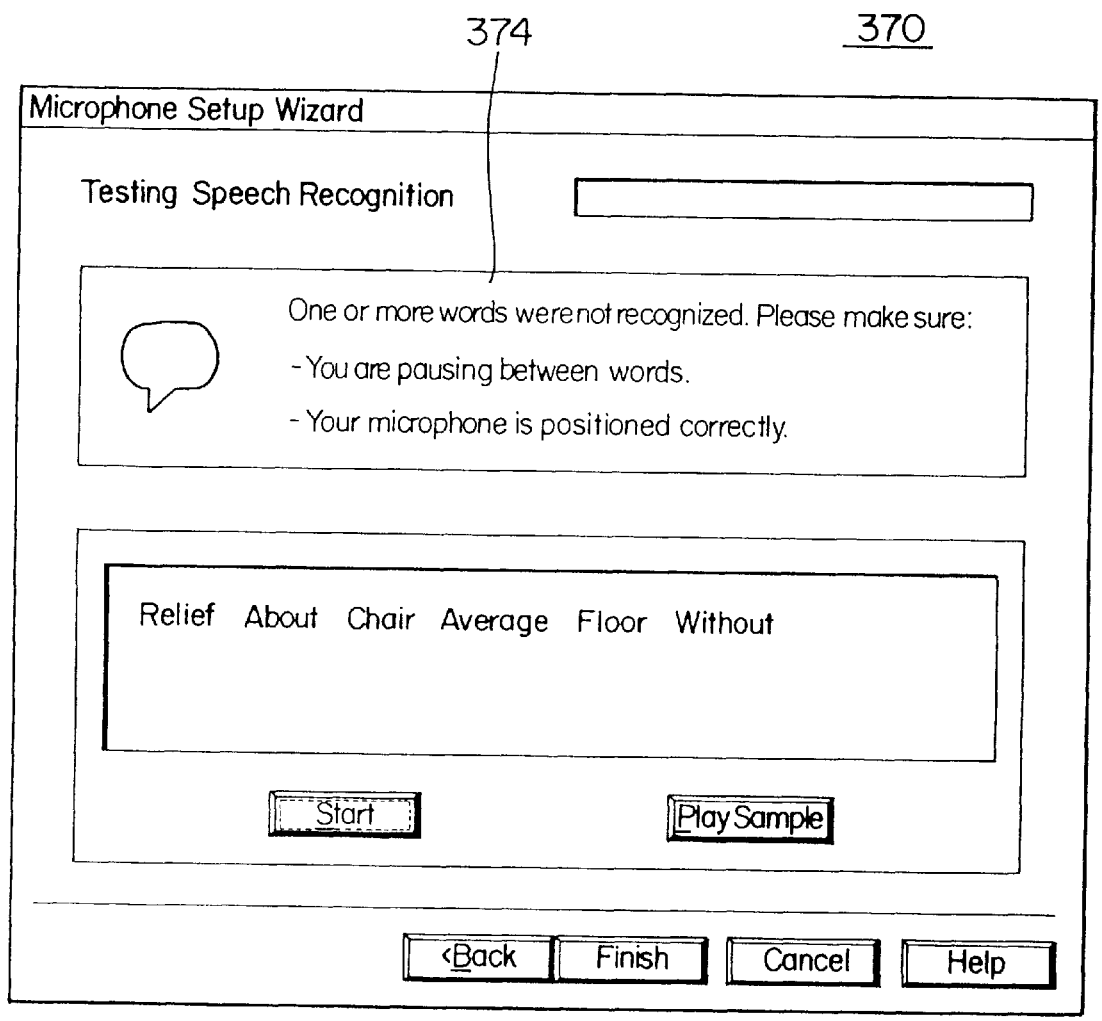
FIG. 36 is the exemplary screen display of FIG. 34 as indicating a first, second or third speech recognition failure.
Figure 37:
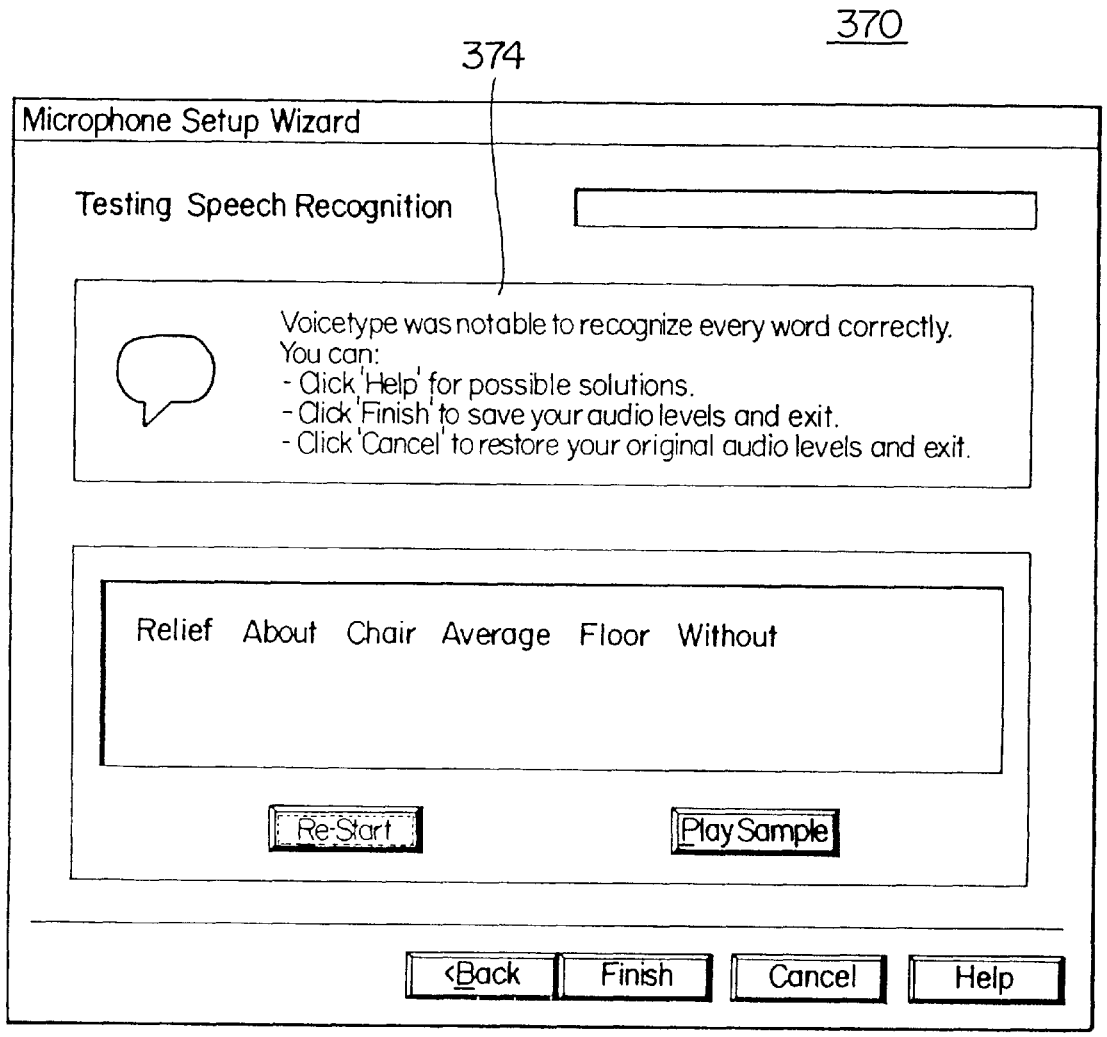
FIG. 37 is the exemplary screen display of FIG. 34 as indicating a fourth speech recognition failure.

If the user receives red words in the test two things will occur. The first three times it happens, the user will be prompted in the instruction section 374 to repeat the test, as shown in FIG. 36. The fourth time the test fails, the instruction section will be modified as shown in FIG. 37. The tool will suggest via on-line help that the user may need to go through enrollment or check the user's audio system.

Figure 38:
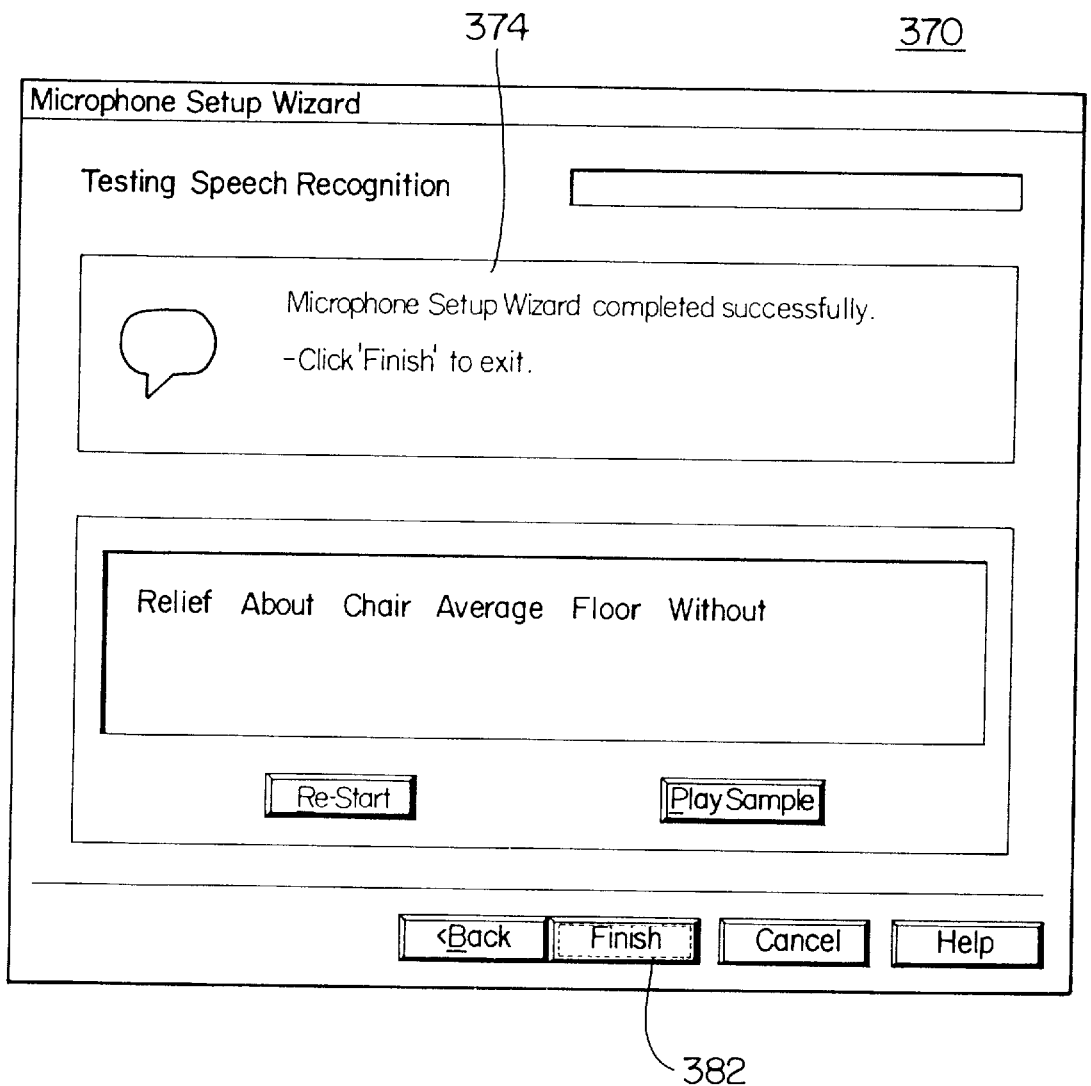
FIG. 38 is the exemplary screen display of FIG. 34 as indicating successful completion of the speech recognition test.

When the user successfully completes this task, a message is displayed in section 374 that the test was successful, as shown in FIG. 38, corresponding to the microphone setup successful step in block 52. The user is prompted to click the Finish button, in order to store all of the adjustments and respective registry entries of the application and to exit from the tool. Thereafter, the user can use the application for speech recognition without further adjustment.

The branch beginning with path 20 does not include an adjusting headset step because the nature of the microphone is unknown to the tool. Since none of the adapters that might be necessary for use with the VoiceType microphone can be suggested by the tool for use with the other kind of microphone, the branch beginning with path 20 does not rejoin the rest of the flow chart until a microphone passing result leads to block 46 or until a microphone failing result leads to block 58.

Figure 39:
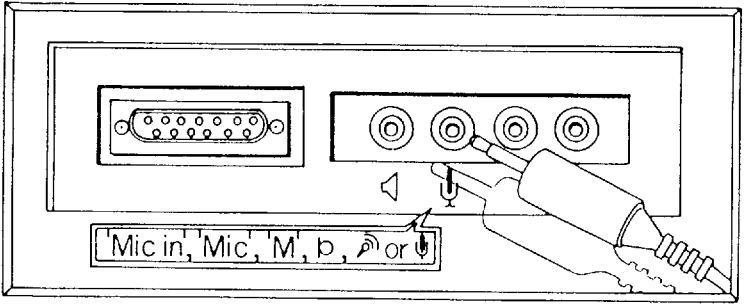
FIG. 39 is an exemplary screen display for a graphical user interface useful for explaining the connection and configuration of a generic headset microphone.
Figure 40:
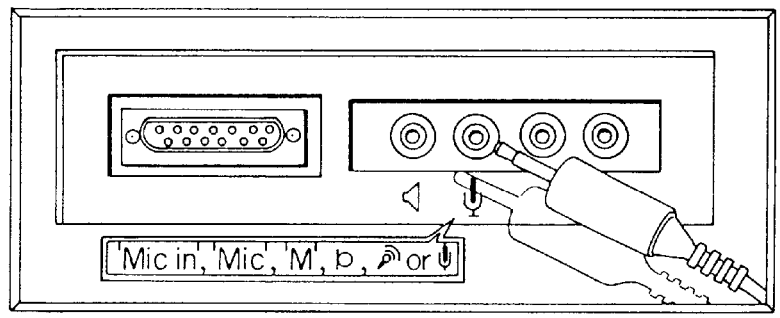
FIG. 40 is an exemplary screen display for a graphical user interface useful for explaining the connection and configuration of a generic desktop microphone.
Figure 41:
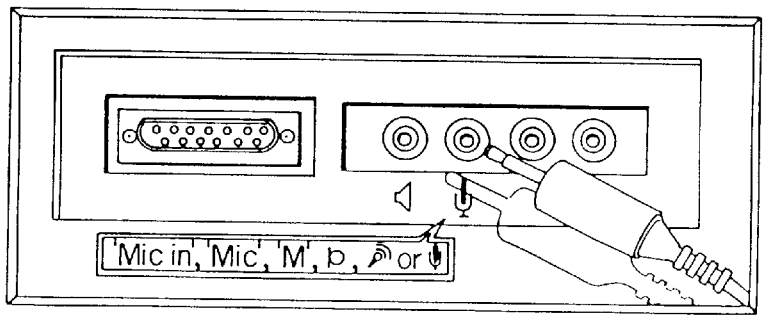
FIG. 41 is an exemplary screen display for a graphical user interface useful for explaining the connection and configuration of a generic monitor microphone.
Figure 42:
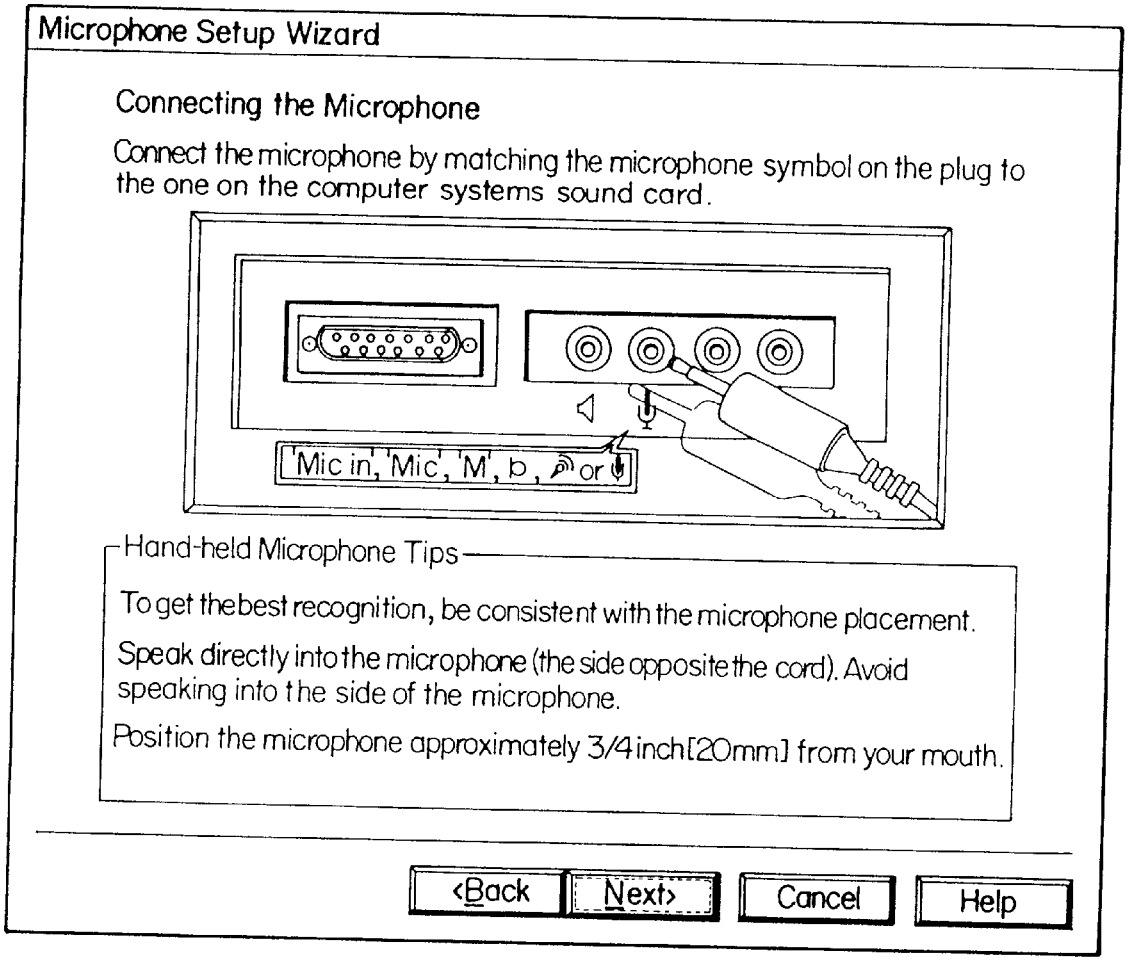
FIG. 42 is an exemplary screen display for a graphical user interface useful for explaining the connection and configuration of a generic hand-held microphone.
Figure 43:
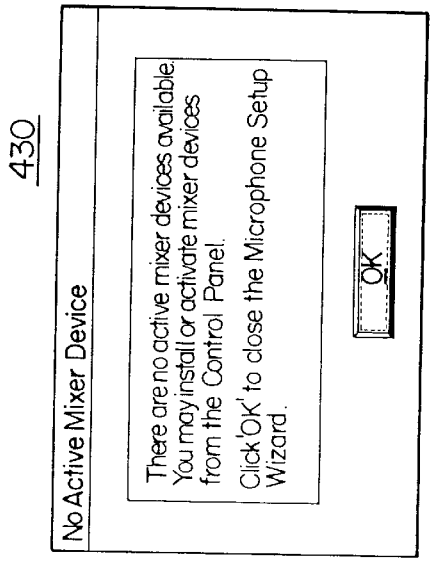
FIG. 43 is an exemplary screen display for a graphical user interface useful for instructing a user to exit from an incomplete microphone setup.

Referring back to connecting and testing the not Voice-Type microphone in block 56 of the branch starting with path 20, several GUI displays can nevertheless be generated that provide tips for connecting and using various kinds of microphones. GUI display 380 shown in FIG. 39 provides tips for connecting and using a generic headset microphone. GUI display 390 shown in FIG. 40 provides tips for connecting and using a generic desktop microphone. GUI display 400 shown in FIG. 41 provides tips for connecting and using a generic monitor microphone. GUI display 410 shown in FIG. 42 provides tips for connecting and using a generic hand held microphone. If the microphone test, which is the same as described in connection with block 38 is successful, the process branches on path 70 to block 46. If the microphone test is not successful, the process branches on path 72 to block 58.

Figure 47:
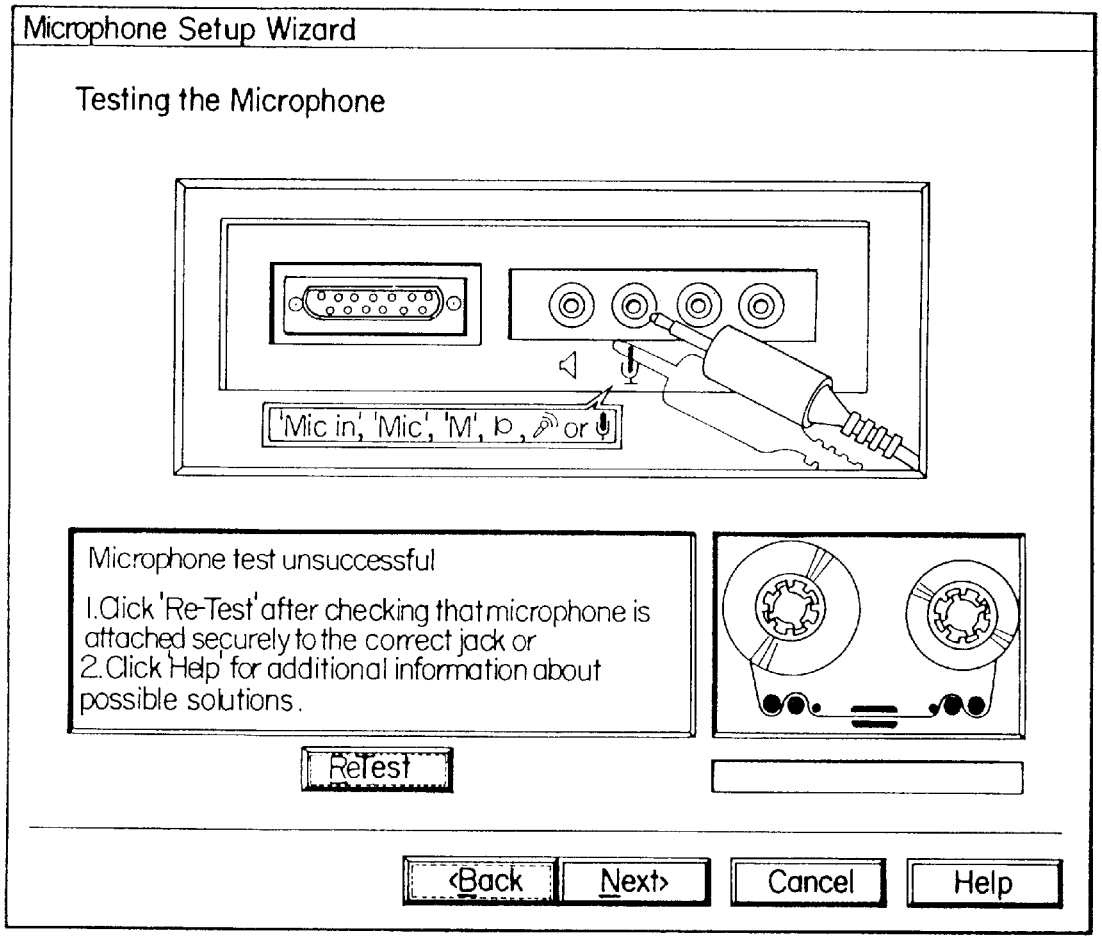
FIG. 47 is an exemplary screen display for a graphical user interface useful for advising a user that testing the microphone was unsuccessful.

The microphone setup unsuccessful step of block 58, referred to above, generates the GUI display 480 shown in FIG. 47.

Throughout various stages of the process, certain conditions may be detected, which require termination of the microphone setup, other than failure of the various tests explained above. GUI displays can be provided for these situations. Some of these, but by no means an exclusive set, are also shown in the drawings.

A message 422 enables the user to exit the tool prior to the microphone setup being successfully completed, for any of the number of failures explained above. If the user clicks the Yes button, the tool exits. If the user clicks the No button, the Exit dialog is terminated and the tool returns to the setup process.

Figure 44:
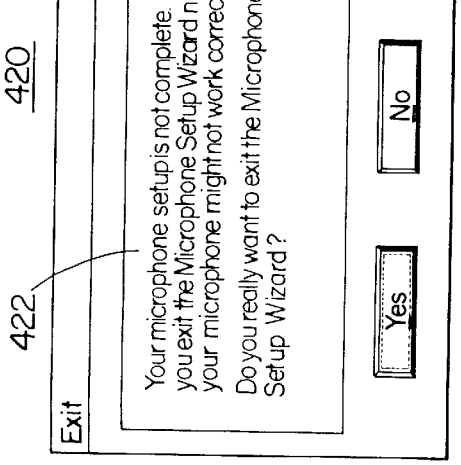
FIG. 44 is an exemplary screen display for a graphical user interface useful for advising a user that no active mixer device is available.

GUI display 430 shown in FIG. 44 informs the user that the computer system does not have an active mixer device associated with the currently selected audio device. The user is presented with some instructions and then prompted to click OK to exit from the tool.

Figure 45:
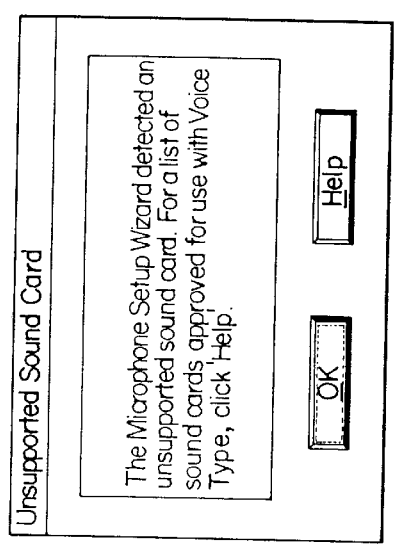
FIG. 45 is an exemplary screen display for a graphical user interface useful for advising a user that no sound card was found.

GUI display 440 shown in FIG. 45 informs the user that no sound card could be found in the computer system. The user is prompted to click the Help button for an Internet URL (web page) and/or a list of compatible sound cards.

Figure 46:
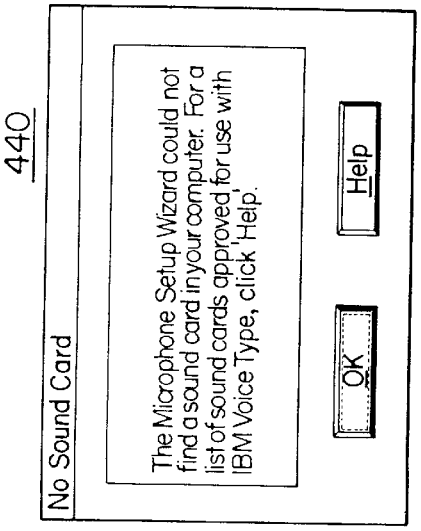
FIG. 46 is an exemplary screen display for a graphical user interface useful for advising a user an unsupported sound card was found.

GUI display 450 shown in FIG. 46 informs the user that the tool detected only an unsupported sound card. If the user clicks OK, the tool exits. If the user clicks Help instructions are provided on where to find additional information on how to resolve the problem.

Figure 48:
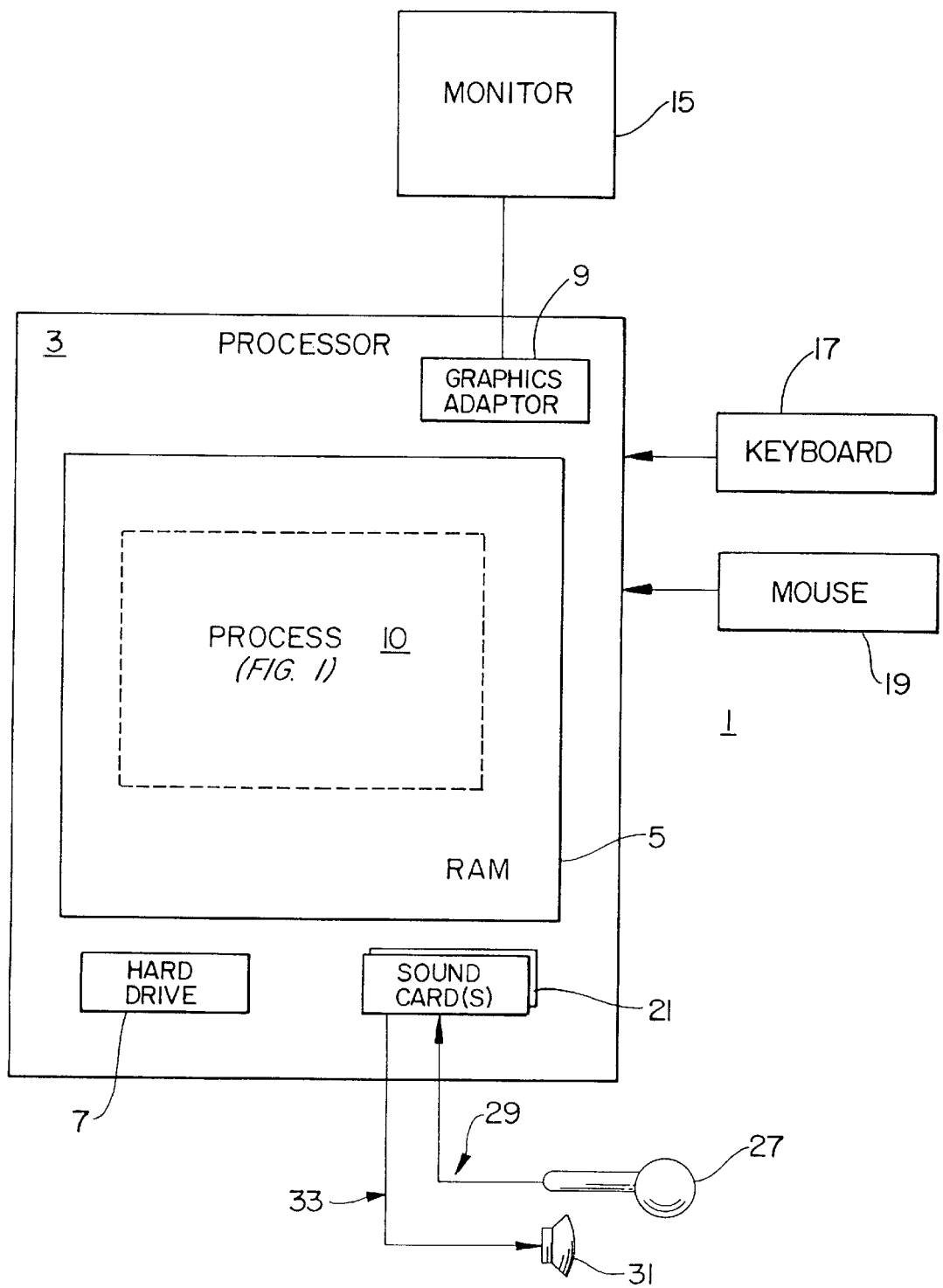
FIG. 48 is a block diagram of a computer system that can be programmed with a routine set of instructions for implementing the method and graphical user interfaces in accordance with the inventive arrangements.

A computer system 1 is shown in block diagram form in FIG. 48. The computer system is programmed with a set of instructions stored in a physical medium, for example a hard drive 7 and/or a random access memory (RAM) 5 of a central processor 3, for optimizing an audio interface 29, 33 between one or more sound or audio cards 21 in the computer apparatus and each of a microphone 27 and a speaker 31. Microphone 27 is intended to represent, for example, a headset microphone, a desktop microphone, a monitor microphone and a hand held microphone. Speaker 31 is intended to represent, for example, one or more internal speakers, one or more external speakers, one or more monitor speakers or a headset speaker. The computer system 1 has a graphics adapter 9 that generates the GUI displays explained above and shown in FIGS. 2–48. The computer system further comprises a monitor 15, a keyboard 17 and a mouse 19. The dashed line box shown in random access memory 5 represents the process 10 of the flow chart shown in FIG. 2, and is intended to represent a programmed routine of instructions, in accordance with the inventive arrangements, stored in a physical medium embodied by hard drive 7 and loaded into another physical medium embodied by random access memory 5. The programmed routine of instructions implements the steps of the configuring process as shown and described herein.

The numerous inventive arrangements disclosed herein provide numerous advantages in simplifying configuring an audio interface, particularly for a microphone connection and adjustment for use with a speech recognition application, although such a microphone setup can be used for other applications as well. This invention is unique in the following respects.

Step by step instructions are provided for connecting a microphone to various audio systems. The audio input is tested to determine that the microphone is properly configured, in both power and signal parameters, to provide proper audio input and output.

Program flow is adapted depending on selection of the audio output device.

The microphone configuration and adjustments are designed to work with and for either dynamic and electret types of microphones.

Comparing background noise levels to speech levels allows operation over a wide range of microphones and audio systems.

The audio mixer is configured for speech recognition by selecting and adjusting microphone inputs, while at the same time, deselecting inputs and outputs as specific to each configuration that would otherwise interfere with microphone operation.

Multiple audio cards are supported, allowing the user to select between one or more audio cards for input and output. Mixer adjustments are based on the audio card selection, and for each card separately.

Sound cards are tested in the system to insure that only those sound cards that meet the minimum requirements to support the speech application are listed for selection by the user.

The program flow is modified after the first time through the microphone configuration process. Subsequent runs allow the user to bypass the microphone hardware configuration tests and go directly to the mixer adjustments.

Graphic user interfaces and associated displays are designed to be easily configured for different combinations of microphone and manufacture-specific information.

What is claimed is:

1. A method for configuring an audio interface for a voice recognition application in a computer system, comprising the steps of:
   (a) displaying a first graphical user interface having a message prompting a user to initiate testing of a microphone connection, a user activatable button and at least one icon representing recording status;
   (b) in response to activation of said button:
      (1) modifying said message section to instruct the user to remain silent;
      (2) recording background noise through said microphone;
      (3) initiating an animation of said at least one icon to represent an active recording status; and, (4) terminating said background noise recording and said animation of said at least one icon;

(c) upon termination of said background noise recording:
(1) modifying said message to instruct the user to speak into said microphone;
(2) recording the user speaking through said microphone;
(3) reinitiating said animation of said at least one icon; and,
(4) terminating said recording of the user speaking and said animation of said icon; and, (d) processing said recordings of said background noise and the user speaking to determine a comparative signal level of said recordings and using said comparative signal level to determine whether a valid microphone signal is present.

2. The method of claim 1, further comprising the steps of:

(e) upon successful processing of said recordings, modifying said message section to indicate said successful termination of said microphone connection testing.

3. The method of claim 1, further comprising the steps of:

(f) upon unsuccessful processing of said recordings, modifying said message section to indicate said unsuccessful termination of said microphone connection testing; and, (g) prompting said user to initiate re-testing of said microphone testing; and, (h) upon initiation of said re-testing, repeating steps (b) through (d).

4. The method of claim 1, further comprising the steps of:

(e) upon unsuccessful processing of said recordings, modifying said message section to indicate said unsuccessful termination of said microphone connection testing; and, (f) prompting said user to initiate re-testing of said microphone testing; and, (g) upon initiation of said re-testing, repeating steps (b) through (d).

5. The method of claim 1, further comprising the step of representing said recording status with said at least one icon representing a tape recorder.

6. The method of claim 1, further comprising the step of representing said recording status with said at least one icon representing a volume meter.

7. The method of claim 1, further comprising the step of representing said recording status with a first icon representing a tape recorder and with a second icon representing a volume meter.

8. A computer programmed with a routine set of instructions for configuring an audio interface for a speech recognition application stored in a physical medium, comprising:

means for displaying a first graphical user interface having a message prompting a user to initiate testing of a microphone connection, a user activatable button and at least one icon representing recording status;

means operable in response to activation of said button:
for modifying said message section to instruct the user to remain silent;
for recording background noise through said microphone;
for initiating an animation of said at least one icon to represent an active recording status; and,
for terminating said background noise recording and said animation of said at least one icon;

means operable upon termination of said background noise recording:
for modifying said message to instruct the user to speak into said microphone;
for recording the user speaking through said microphone;
for reinitiating said animation of said at least one icon; and,
for terminating said recording of the user speaking and said animation of said icon; and, means for processing said recordings of said background noise and the user speaking to determine a comparative signal level of said recordings and using said comparative signal level to determine whether a valid microphone signal is present.

9. The computer of claim 8, further comprising means operable upon successful processing of said recordings for modifying said message section to indicate said successful termination of said microphone connection testing.

10. The computer of claim 9, further comprising:
means operable upon unsuccessful processing of said recordings for modifying said message section to indicate said unsuccessful termination of said microphone connection testing; and,
means for prompting said user to initiate re-testing of said microphone testing.

11. The computer of claim 8, wherein said at least one icon represents a tape recorder.

12. The computer of claim 8, wherein said at least one icon represents a volume meter.

13. The computer of claim 8, wherein said at least one icon comprises a first icon representing a tape recorder and a second icon representing a volume meter.

* * * * *